(12) United States Patent
Kawamata et al.

(10) Patent No.: US 9,158,666 B2
(45) Date of Patent: Oct. 13, 2015

(54) COMPUTER SYSTEM AND COMPUTER SYSTEM INFORMATION STORAGE METHOD

(71) Applicant: Hitachi, Ltd., Tokyo (JP)

(72) Inventors: Kaoru Kawamata, Hadano (JP); Takeshi Fukue, Hiratsuka (JP); Mitsuaki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 336 days.

(21) Appl. No.: 13/658,427

(22) Filed: Oct. 23, 2012

(65) Prior Publication Data

US 2013/0290651 A1 Oct. 31, 2013

(30) Foreign Application Priority Data

Oct. 27, 2011 (JP) ................................. 2011-235602

(51) Int. Cl.
*G06F 12/00* (2006.01)
*G06F 11/20* (2006.01)

(52) U.S. Cl.
CPC ............ *G06F 12/00* (2013.01); *G06F 11/2038* (2013.01); *G06F 11/2046* (2013.01); *G06F 11/2092* (2013.01); *G06F 11/2094* (2013.01); *G06F 11/2097* (2013.01); *G06F 11/2089* (2013.01)

(58) Field of Classification Search
CPC .......... G06F 11/20; G06F 11/22; G06F 12/00
USPC ................................................. 711/103, 154
See application file for complete search history.

(56) References Cited

U.S. PATENT DOCUMENTS

| | | | | |
|---|---|---|---|---|
| 6,333,932 B1* | 12/2001 | Kobayasi et al. | ............. | 370/389 |
| 6,378,021 B1* | 4/2002 | Okazawa et al. | ............. | 710/317 |
| 6,650,749 B1* | 11/2003 | Laulo | ............. | 379/279 |
| 7,664,110 B1* | 2/2010 | Lovett et al. | ............. | 370/392 |
| 2003/0126315 A1* | 7/2003 | Tan et al. | ............. | 710/1 |
| 2003/0179712 A1* | 9/2003 | Kobayashi et al. | ............. | 370/249 |
| 2004/0090995 A1* | 5/2004 | Kang et al. | ............. | 370/535 |
| 2006/0104289 A1* | 5/2006 | Lee | ............. | 370/400 |
| 2008/0313362 A1* | 12/2008 | Takamoto | ............. | 710/19 |
| 2009/0138753 A1* | 5/2009 | Tameshige et al. | ............. | 714/4 |
| 2010/0064165 A1* | 3/2010 | Kambara et al. | ............. | 714/4 |
| 2010/0325477 A1* | 12/2010 | Takamoto | ............. | 714/5 |

FOREIGN PATENT DOCUMENTS

JP 2000-148525 5/2000

* cited by examiner

*Primary Examiner* — Yaima Rigol
*Assistant Examiner* — Tasnima Matin
(74) *Attorney, Agent, or Firm* — Foley & Lardner LLP

(57) ABSTRACT

If simultaneous replacement main system and standby system of a management module was necessary due to a failure, fault or other problem in a structure containing redundant management modules, then the management information retained in the management module will be lost. A computer system contains an external storage device that is outside the manager module. This external storage device stores the same information as the management information held by the main system management module, and after replacing the management modules the management information held in the external storage device is restored in the management module. A switch is further included between the external storage device and the management module, and controlling this switch from the management module allows the plurality of management modules to exclusively access the external memory device.

12 Claims, 23 Drawing Sheets

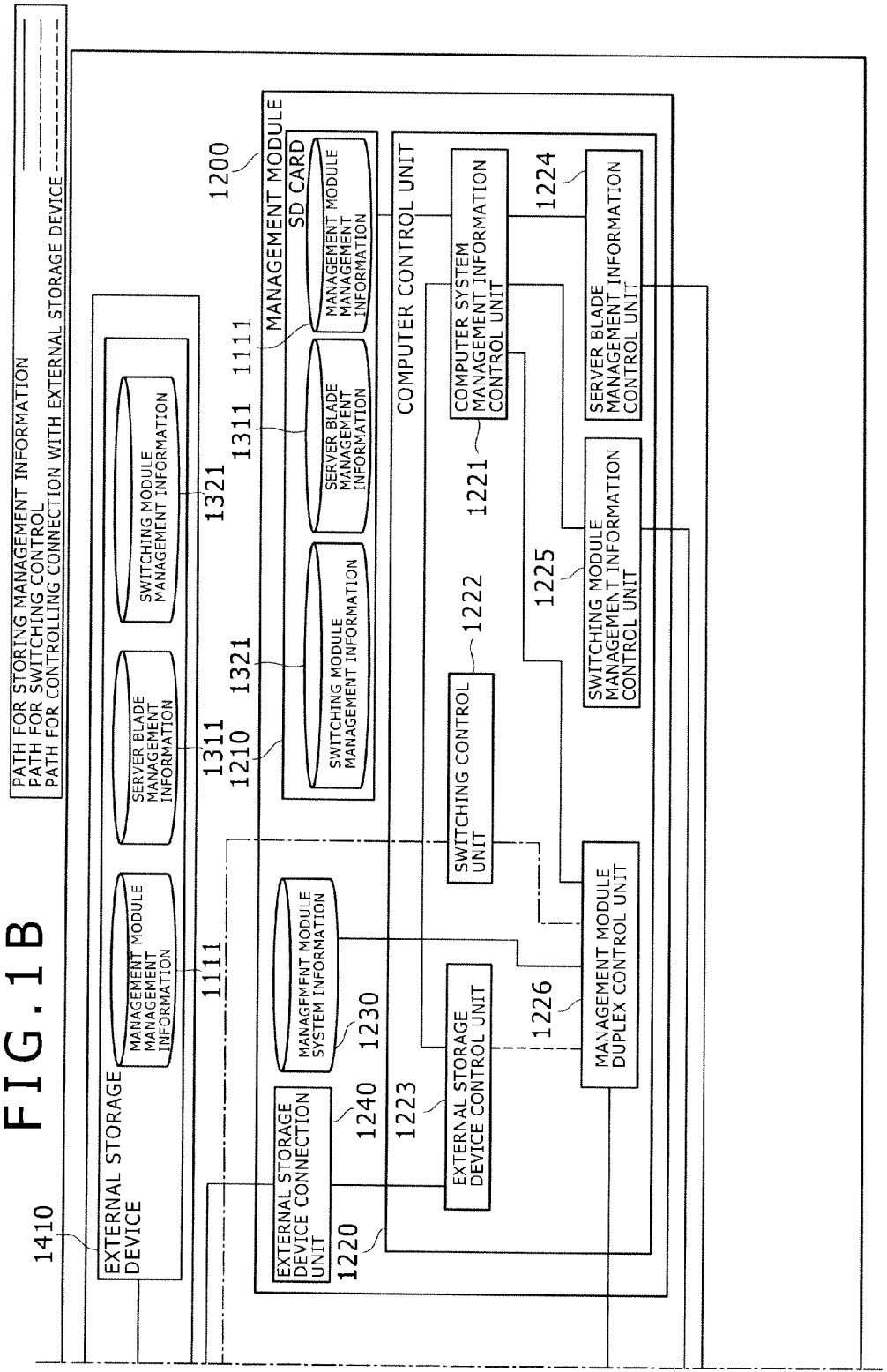

FIG.3

| MANAGEMENT MODULE 1100 | | MANAGEMENT MODULE 1200 | |
|---|---|---|---|
| MAIN SYSTEM | ○ | MAIN SYSTEM | × |
| STANDBY SYSTEM | × | STANDBY SYSTEM | ○ |
| FAULT | × | FAULT | × |
| UNSET SYSTEM STATE | × | UNSET SYSTEM STATE | × |

3000

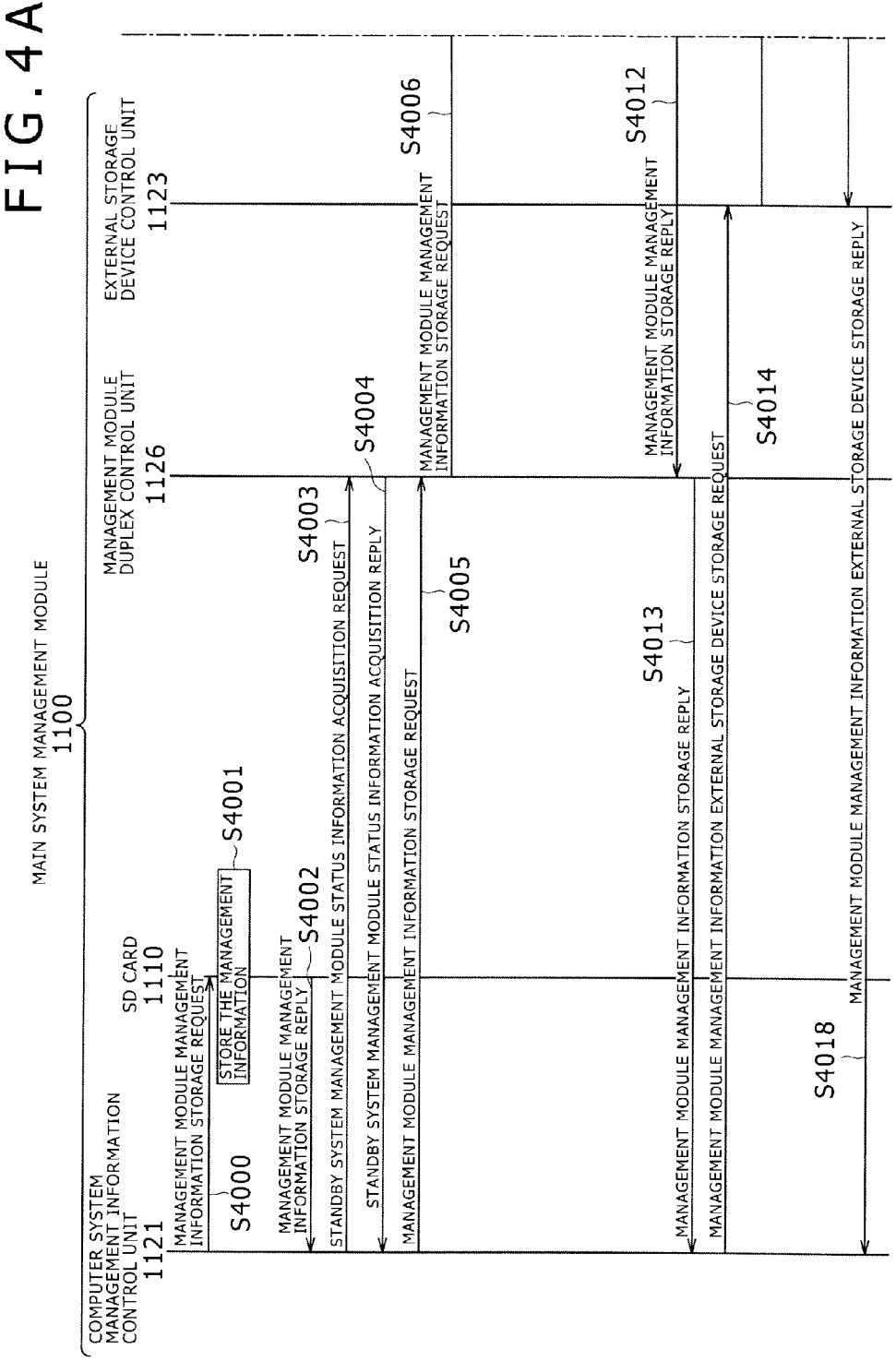

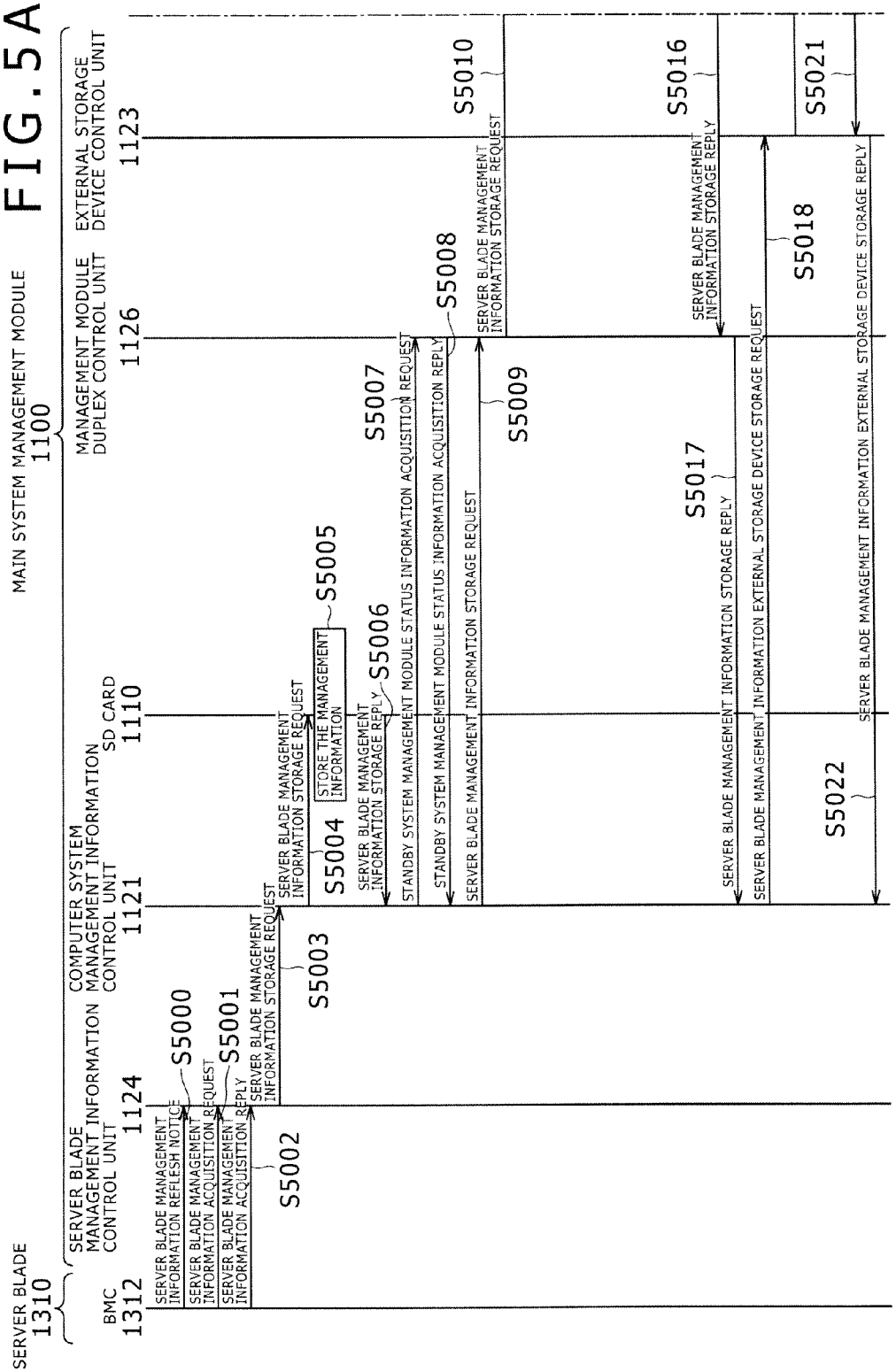

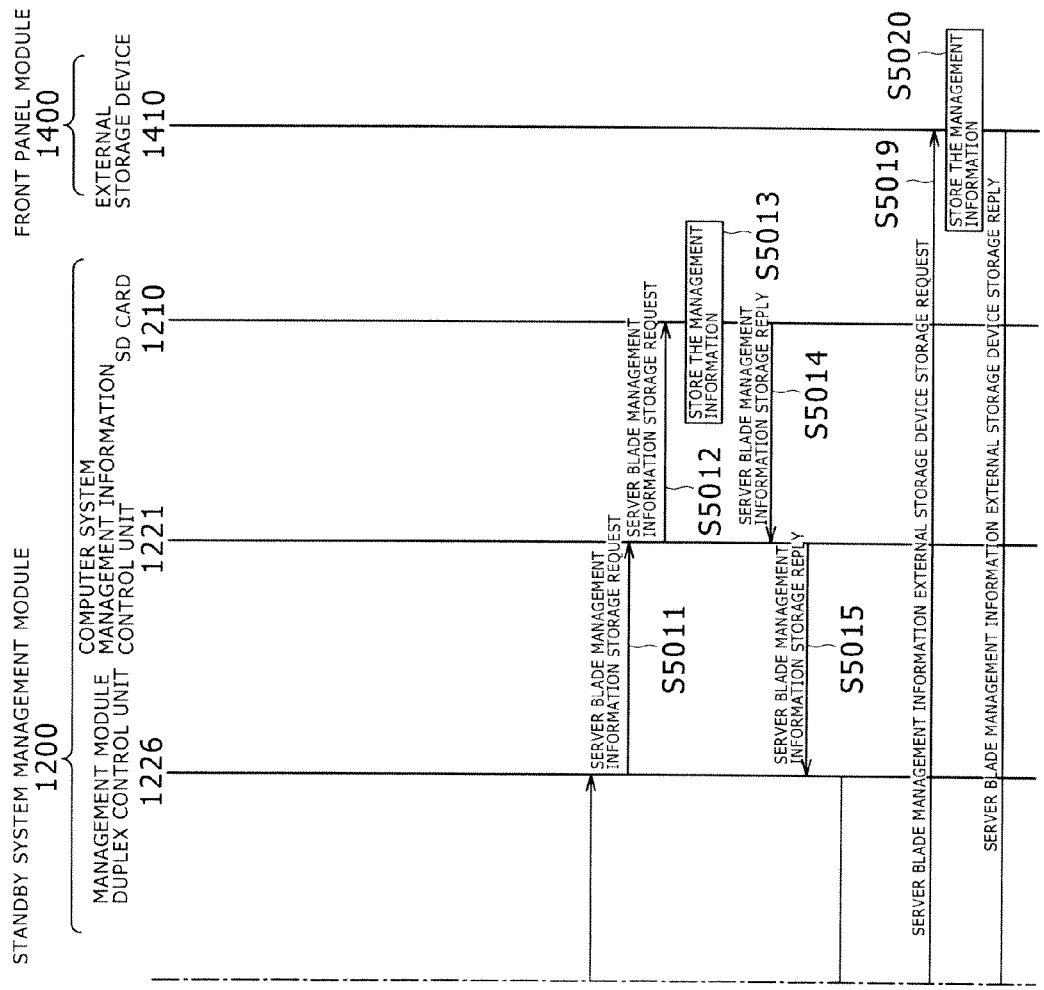

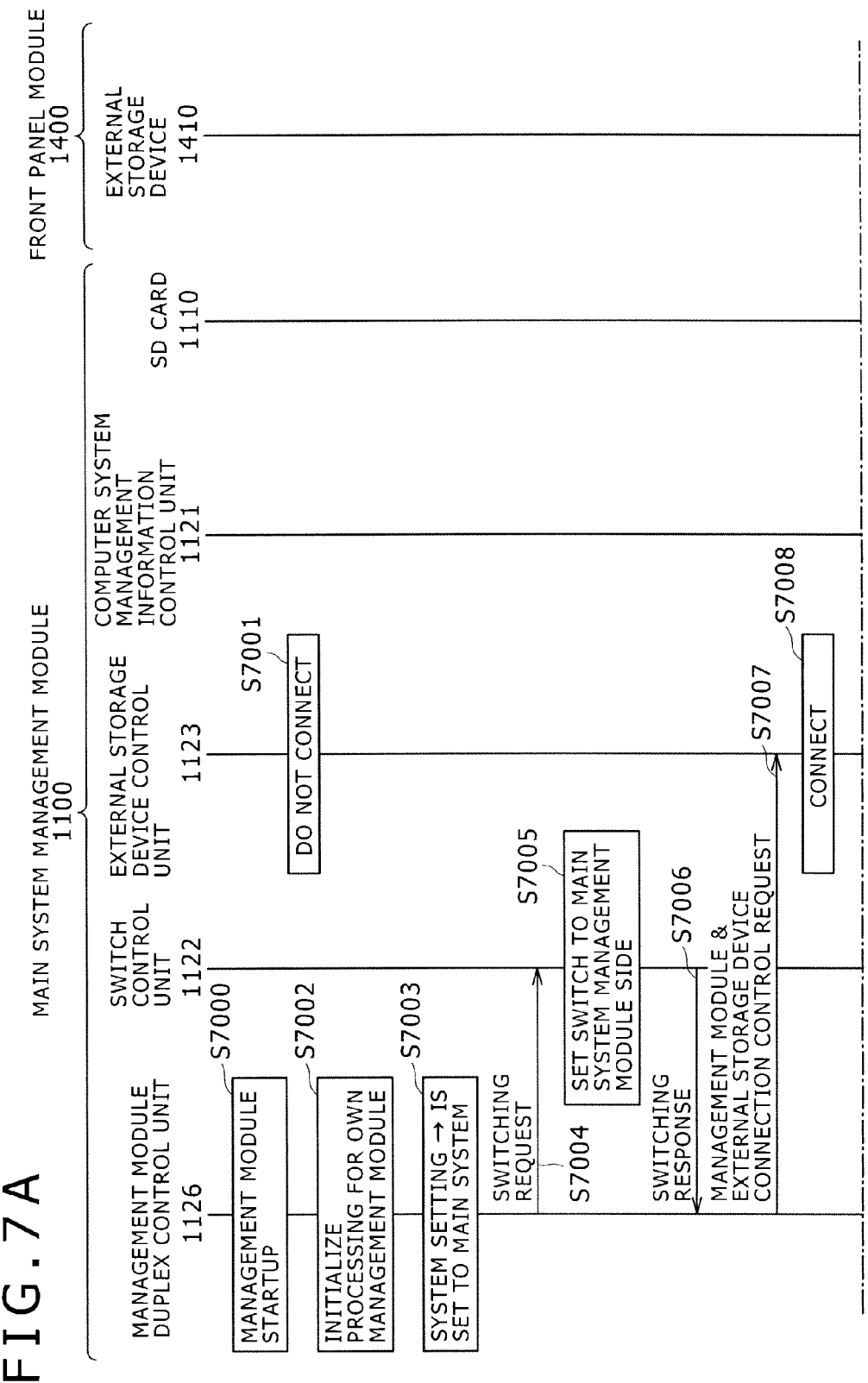

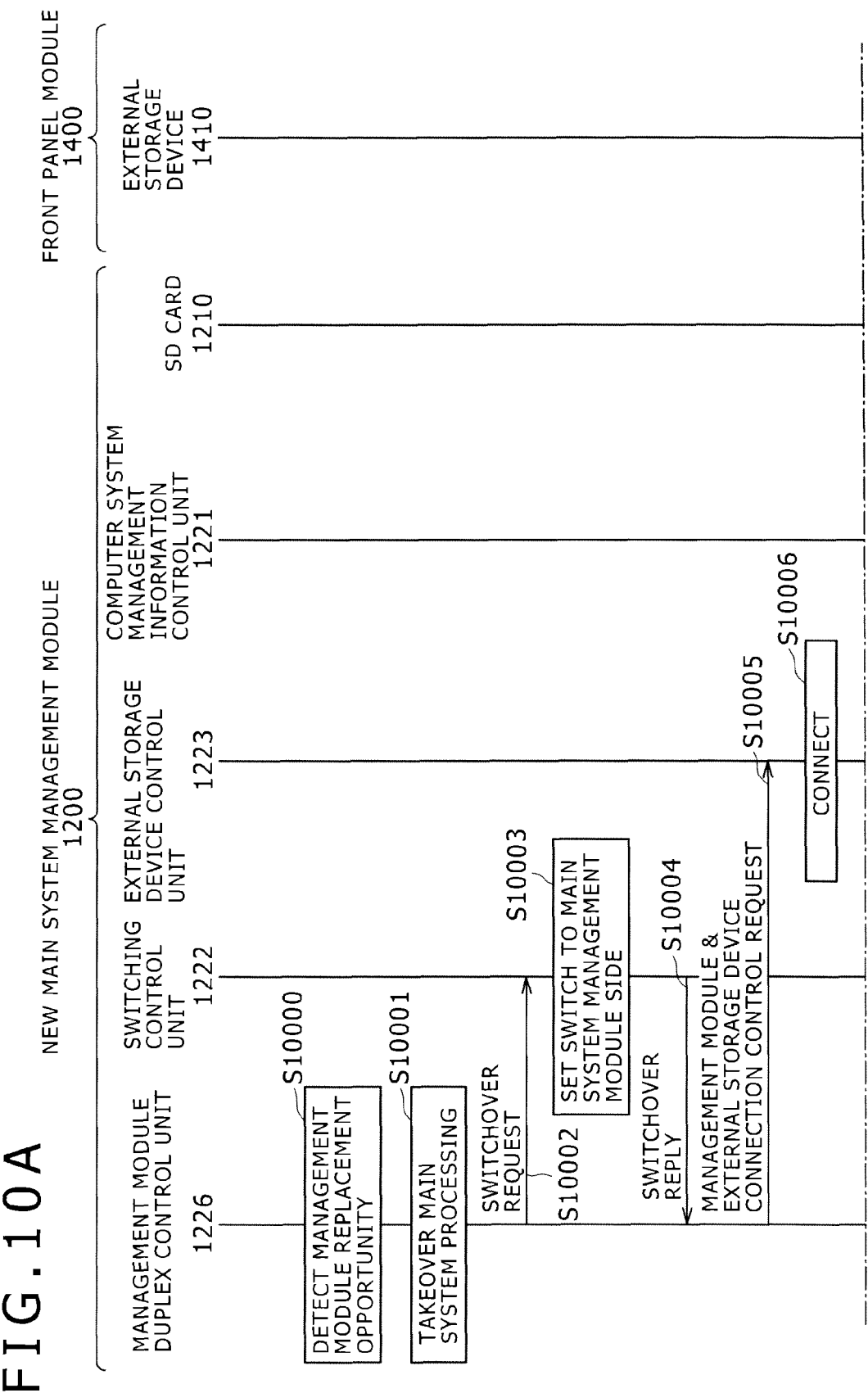

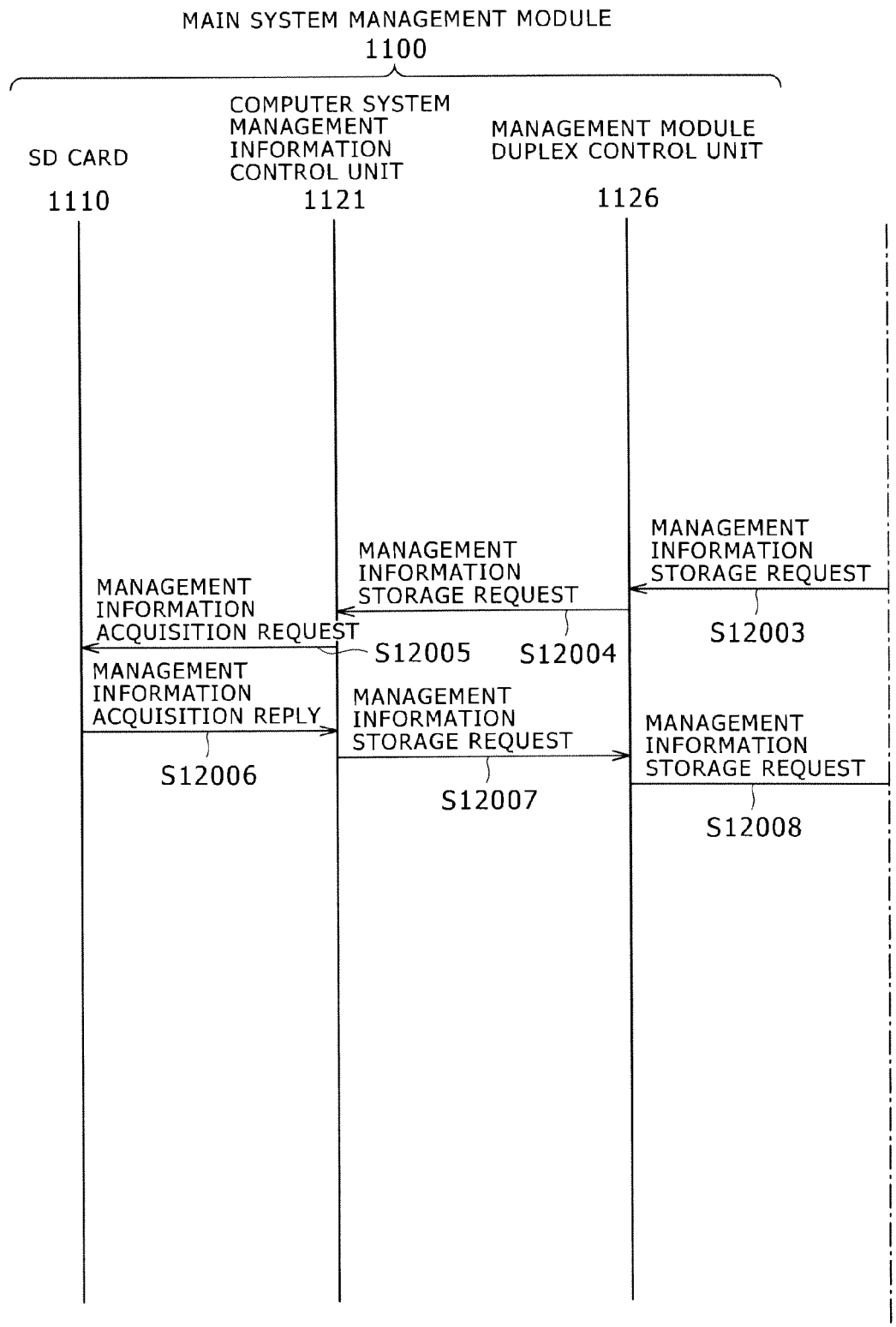

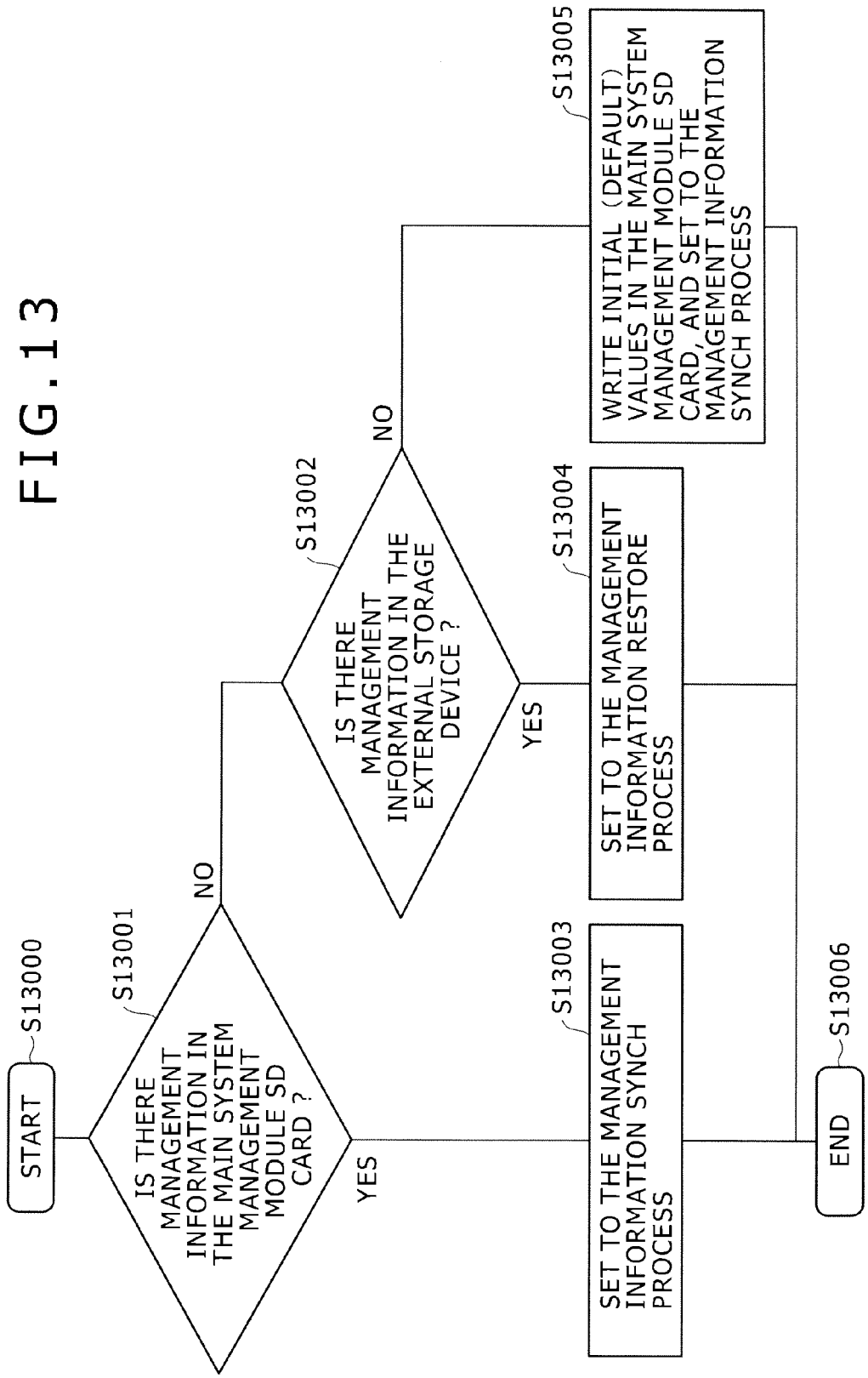

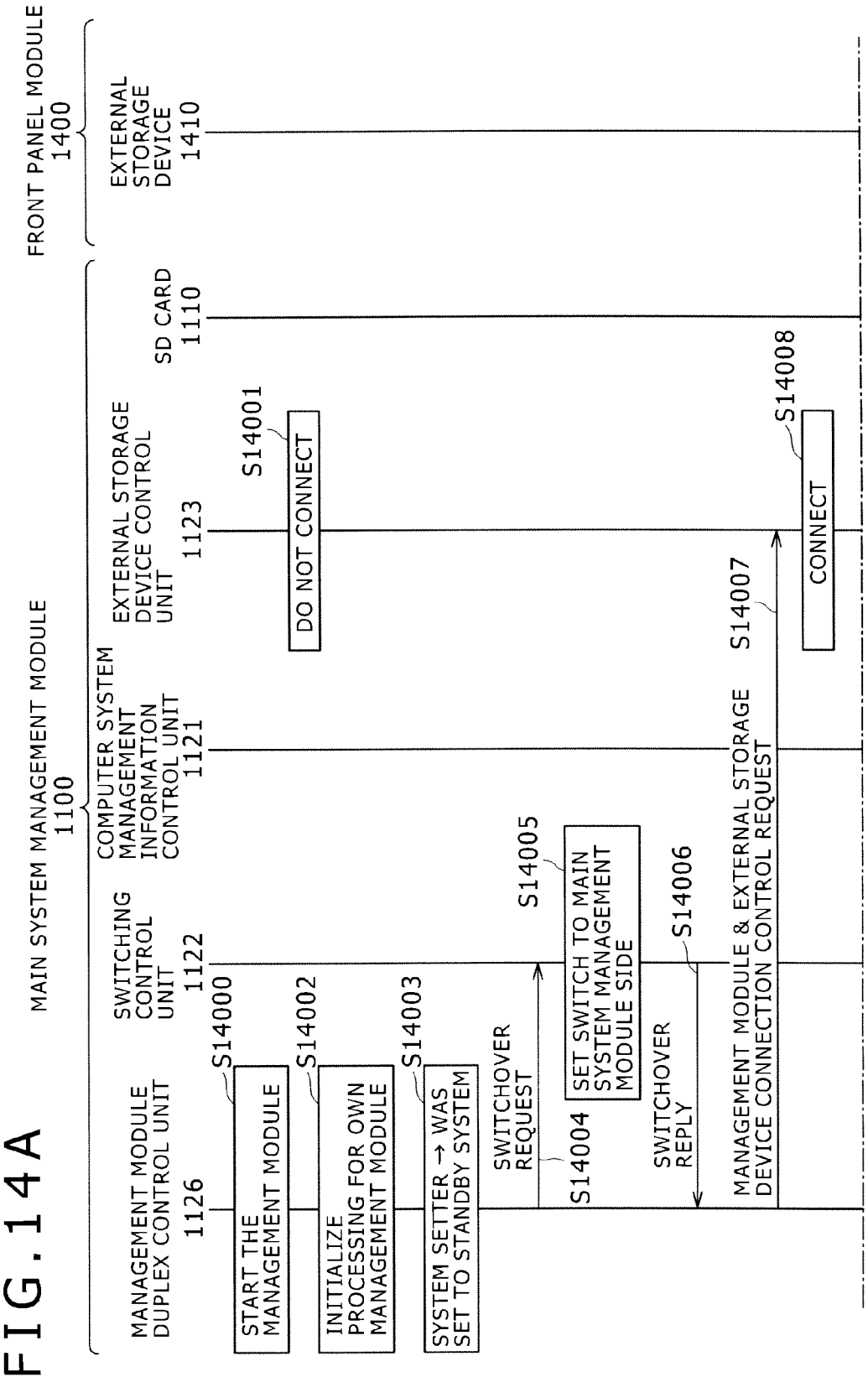

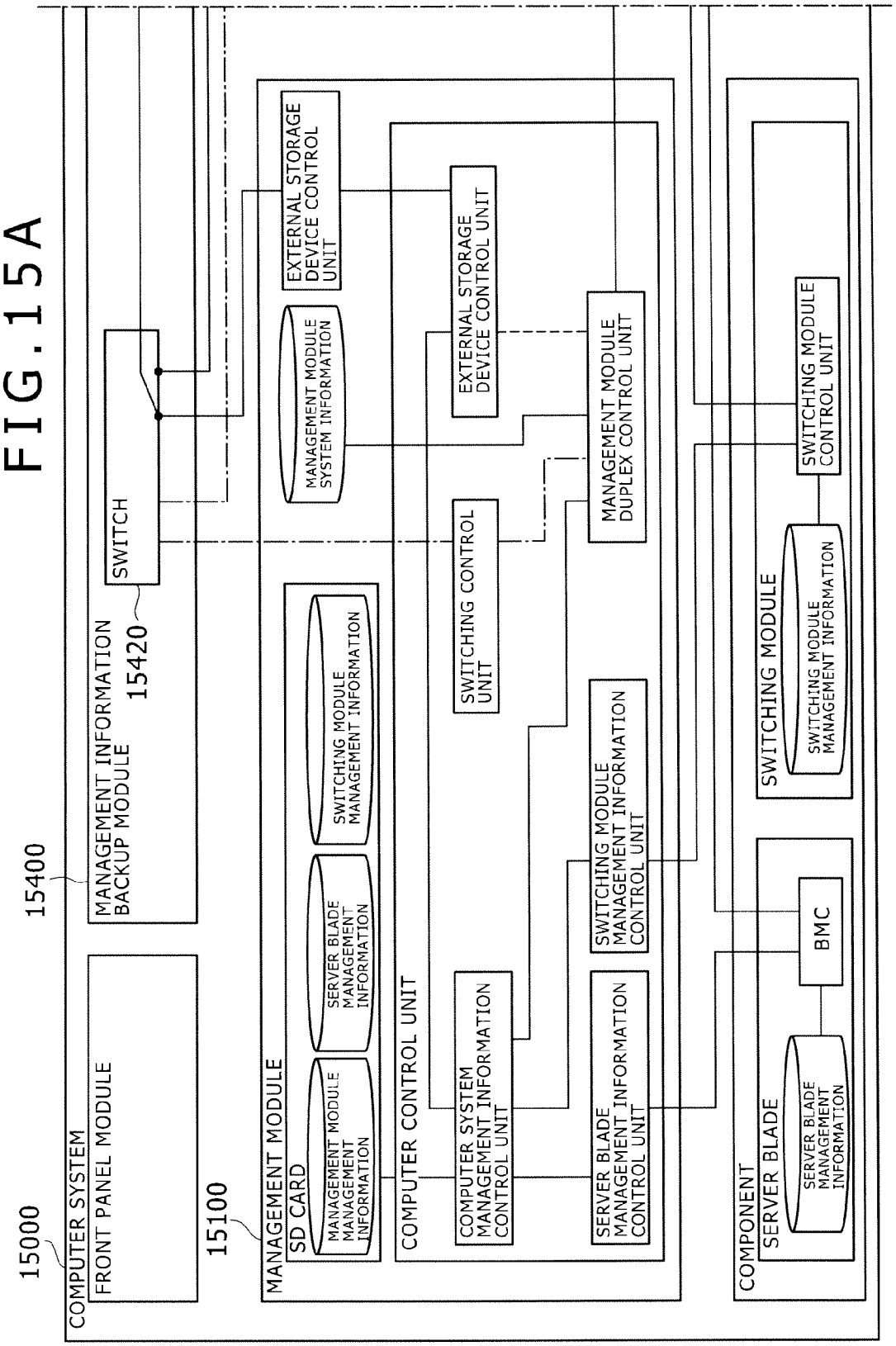

COMPUTER SYSTEM AND COMPUTER SYSTEM INFORMATION STORAGE METHOD

CROSS-REFERENCE TO RELATED PATENT APPLICATIONS

Japan Priority Application 2011-235602, filed Oct. 27, 2011 including the specification, drawings, claims and abstract, is incorporated herein by reference in its entirety.

FIELD OF THE INVENTION

The present invention relates to a computer system and a method for storing management information in a computer system.

BACKGROUND OF THE INVENTION

An often seen structure in computer systems used nowadays such as blade servers utilizes a plurality of servers controlled by one management module. Moreover, Japanese Unexamined Patent Application Publication No. 2000-148525 discloses a "Redundant System with a Hot Standby Function using Service Processor to Execute Services such as Computer System Power Control and Fault Monitoring."

SUMMARY OF THE INVENTION

In these types of redundant systems, there are two management modules. One management module is for the main system and the other management module is for the standby system. These types of systems have the problem that management information held in the management module is lost if two of the main system and standby system management modules must be simultaneously replaced due to failures, etc.

Management information generally includes frequently refreshed information such as log information. So even in cases where a management server outside of a computer system makes a backup of management information before two of the main system and standby system management modules in the computer system are simultaneously replaced, the management information stored in the management server will be different from the information held in the management module if that management information was refreshed after storing the information in the management server. In such cases, the management server is unable to store the same management information as held by the management module so that restoring the management information that was held by the management module is impossible.

Whereupon the present invention has the object of providing a computer system capable of storing management information held in redundant management modules with greater reliability and a method for storing management information in the computer system.

To resolve the aforementioned problem, the present invention places the management information contained in the main system management module, into an external storage device which is a device different from the management module. During exchange of management modules, the computer system then restores the management information from the external storage device.

The present invention also includes a mechanism to prevent the two main system and standby system module units from simultaneously accessing the external storage device even when writing or reading (loading) management information from the external storage device. Assuming for example a state where the main system management module is connected to the external storage device, if the standby system management module couples to the external storage device, then the coupling between the main system management module and external storage device is instantly cut off, to possibly damage the external storage device and a cause a loss of management information. Therefore, simultaneous access must be prevented.

The computer system of the present invention is in other words, a computer system including a physical server and a plurality of management modules; and further including an external storage device for storing management information for managing the computer system; and a switch for coupling the main system management module that controls the physical server to the external storage device. The management module includes a computer control unit, a switching control unit to control the switching of the switch connections, a management information storage unit for storing the management information, and a multiplexer control unit to control the multiplexing of management information in the plurality of management modules. If the first management module is the main system management module, then the switching control unit of the first management module controls the switching so as to couple the first management module to the external storage device. The computer control unit of the first management module then stores the management information stored in the management information storage unit of the first management module, into the external storage device. The multiplexer control unit of the first management module also communicates with the multiplexer control unit of the second management module serving as the standby system, and stores the management information stored in the management information storage unit of the first management module, into the management information storage unit of the second management module. In computer systems containing a physical server and plural management modules, the present invention is capable of storing management information from the main system management module into the external storage device; and preventing the two (units) of the main system and standby system management modules from simultaneously accessing the external storage device and so renders the effect of preventing loss of management information due to damage to the external storage device.

BRIEF DESCRIPTION OF THE DRAWINGS

FIG. 1A and FIG. 1B are a block diagram of the computer system of the first embodiment;

FIG. 3 is a system status management table containing management module information;

FIG. 4A and FIG. 4B are a drawing showing the sequence when storing the main system management module management information into the standby system management module and the external storage device;

FIG. 5A and FIG. 5B are a drawing showing the sequence when storing the server blade management information into the main system management module and standby system management module and external storage device;

FIG. 7A and FIG. 7B are a flowchart showing the sequence from startup to the beginning of operation of the main system management module;

FIG. 10A and FIG. 10B are a drawing showing the sequence from startup to the beginning of operation of the standby system management module as the new main system management module when a fault occurred in the main system management module;

FIG. 12A and FIG. 12B are a drawing showing the sequence from startup to the beginning of operation when a replacement component was inserted as the standby management module;

FIG. 13 is a flowchart of the restore decision process;

FIG. 14A and FIG. 14B are a drawing showing the sequence from startup to executing the restore process and beginning operation after inserting a replacement component as the main system management module; and FIG. 15A and FIG. 15B are a drawing showing the structure of the computer system of the second embodiment.

DETAILED DESCRIPTION OF THE PREFERRED EMBODIMENTS

First Embodiment

The computer system of the present invention that places the management information from the main system management module into the management module of the standby system and the external storage device is described next in detail while referring to the accompanying drawings.

The computer system of the present embodiment includes an external storage device that is outside the management module within the computer system, and stored information identical to the management information retained in the main system management module, in that external storage device. After the management modules are replaced, the computer system restores the management information retained in the external storage device, into the management module. The computer system further utilizes the external storage device as storage device capable of directly reading and writing management information from the management module and includes a switch between the external storage device and the management module for, and by controlling this switch from the management module can exclusively access this external storage device from a plurality of management module units.

Figure 1A:
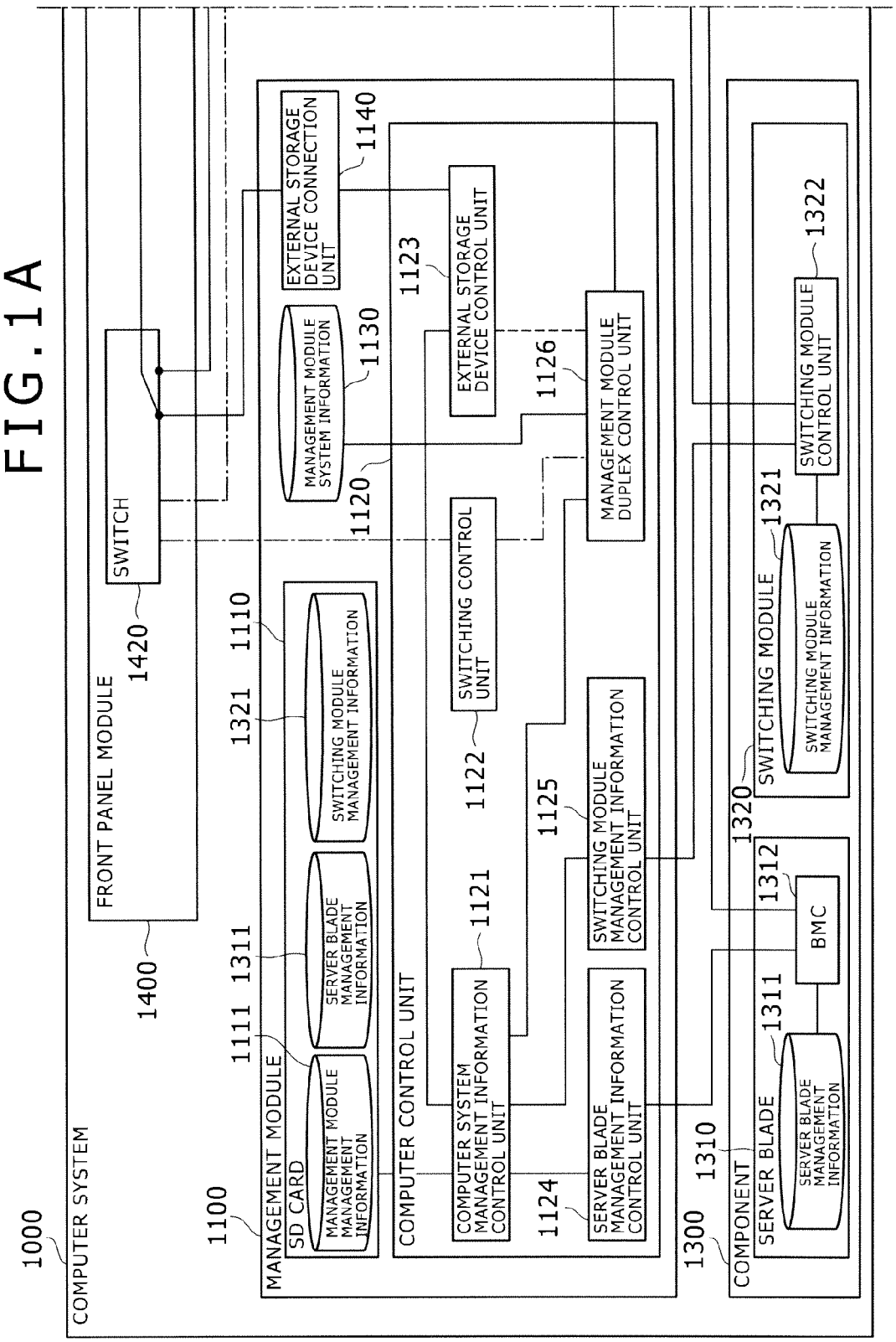

FIG. 1A and FIG. 1B are a block diagram of the computer system of the first embodiment. A computer system 1000 includes a management module 1100 and management module 1200, a component 1300 and a front panel module 1400. The management modules 1100 and 1200 manage each of the modules within the computer system 1000, and manage the overall computer system 1000 by management such as regulating the power supply, monitoring fault status and managing the management information. If the management module operating as the main system has stopped, then the redundant structure along with the management modules 1100 and 1200 operated so that the management module of the standby system functions as the new main system and acquires that management information. The computer system therefore employs a scheme where management information retained by the main system management module is also retained in the management module serving as the standby system.

The component 1300 here signifies a module within the computer system 1000 for controlling the management modules 1100 and 1200. In this embodiment, the component 1300 includes a server blade 1310 and a switching module 1320. The server blade 1310 contains the server blade management information 1311 and the BMC (Baseboard Management Controller) 1312 for monitoring the server blade status. The switching module 1320 contains the switching module management information 1321 and a switching module control unit 1322.

A front panel module 1400 includes an external storage device 1410, and a switch 1420 interposed between that external storage device 1410 and the management module 1100 or 1200. A USB memory is described as a specific example of the external storage device 1410.

The management module 1100 contains an SD card 1110 and computer control unit 1120 and management module system information 1130 and external storage device connection unit 1140. The management module 1200 contains an SD card 1210 and computer control unit 1220 and management module information 1230 and external storage device coupler unit 1240. In addition to computer system management functions such as power supply regulation, and monitor of fault status, the management modules 1100, 1200 also retain management information such as setting information relating to computer system internal modules such as the server and log information, etc.

The SD cards 1110 and 1210 store management information for the management module management information 1111 and the component 1300. In the present embodiment, the management information for the component 1300 includes the server blade management information 1311 and the switching module management information 1321. The SD cards 1110 and 1210 are one embodiment of a management information storage unit for storing management information. However the information storage medium need not be limited to SD cards and may for example include as other examples, a USB memory, a compact flash (registered trademark), or memory card, etc.

The computer control units 1120 and 1220 include the computer system management information control units 1121 and 1221, the switching control units 1122 and 1222, the external storage device control units 1123 and 1223, the server blade management information control units 1124 and 1224, the switching module management information control units 1125 and 1225, and the management module duplex control units 1126 and 1226.

When the server blade management information 1311 and switching module management information 1321 have been stored, the computer system management information control units 1121 and 1221 fulfill the task of storing that information in the SD cards 1110, 1210. The switching control units 1122 and 1222 control the switch 1420 and fulfill the task of controlling the switching of external storage device 1410 and management modules 1100 or 1200.

The switch 1420 couples the external storage device control units 1123 and 1223 to the external storage device 1410. These external storage device control units 1123 and 1223 fulfill the task of storing the server blade management information 1311, the switching module management information 1321, and the management module management information 1111. The external storage device control units 1123 and 1223 control the connection status between the management modules 1100, 1200 and the external storage device 1410 by the external storage device connection unit 1140, 1240.

When the server blade management information 1311 in the server blade 1310 has been refreshed, the server blade management information control units 1124 and 1224 fulfill the task of communicating with the BMC 1312, and storing the refreshed server blade management information 1311 into the SD cards 1110 and 1210. Likewise, when the switching module management information 1321 in the switching module 1320 has been refreshed, the switching module management information control units 1125 and 1225 fulfill the task of communicating with the switching module control units 1322, and storing the refreshed switching module management information 1321 into the SD cards 1110 and 1210. The management module duplex control units 1126 and 1226 fulfill the task for communication between the management module 1100 and the management module 1200.

The management module system information 1130 and 1230 contains information relating to the presence of other management modules (hereafter, other system management modules) within the computer system and information on the system status of the management modules. The management module system information 1130 and 1230 is stored on an information storage medium such as an SD card, a USB memory, a compact flash, or memory card, etc.

The management modules 1100 and 1200 fulfill the task of managing the overall processing of the computer system 1000 such as the power supply regulation, fault monitoring, and information processing, etc. as described above. The computer system 1000 processing does not function if a fault occurs in the management modules themselves. To prevent failure of the processing by the computer system 1000, two management modules 1100 and 1200 units are provided to allow redundancy in the computing system 1000.

Just one side of the management module 1100 or 1200 executes management module functions such as power supply regulation, fault monitoring, and information processing (here called the main system), and the management module on the other side is in the standby state to take over that processing in the event a fault occurs in the management module for the main system (here called the standby system). The processing to set the main system or the standby system should be performed after starting up the management modules. The management modules 1100 and 1200 start up in a state where the system status is not yet set, and immediately after startup perform processing to set which management module will function as the main system management module.

The computer system moreover may contain plural management modules in order to allow multiplexing of the management modules. In this case, one of the management modules serves as the main system, and other management module serves as the standby system.

Figure 2:
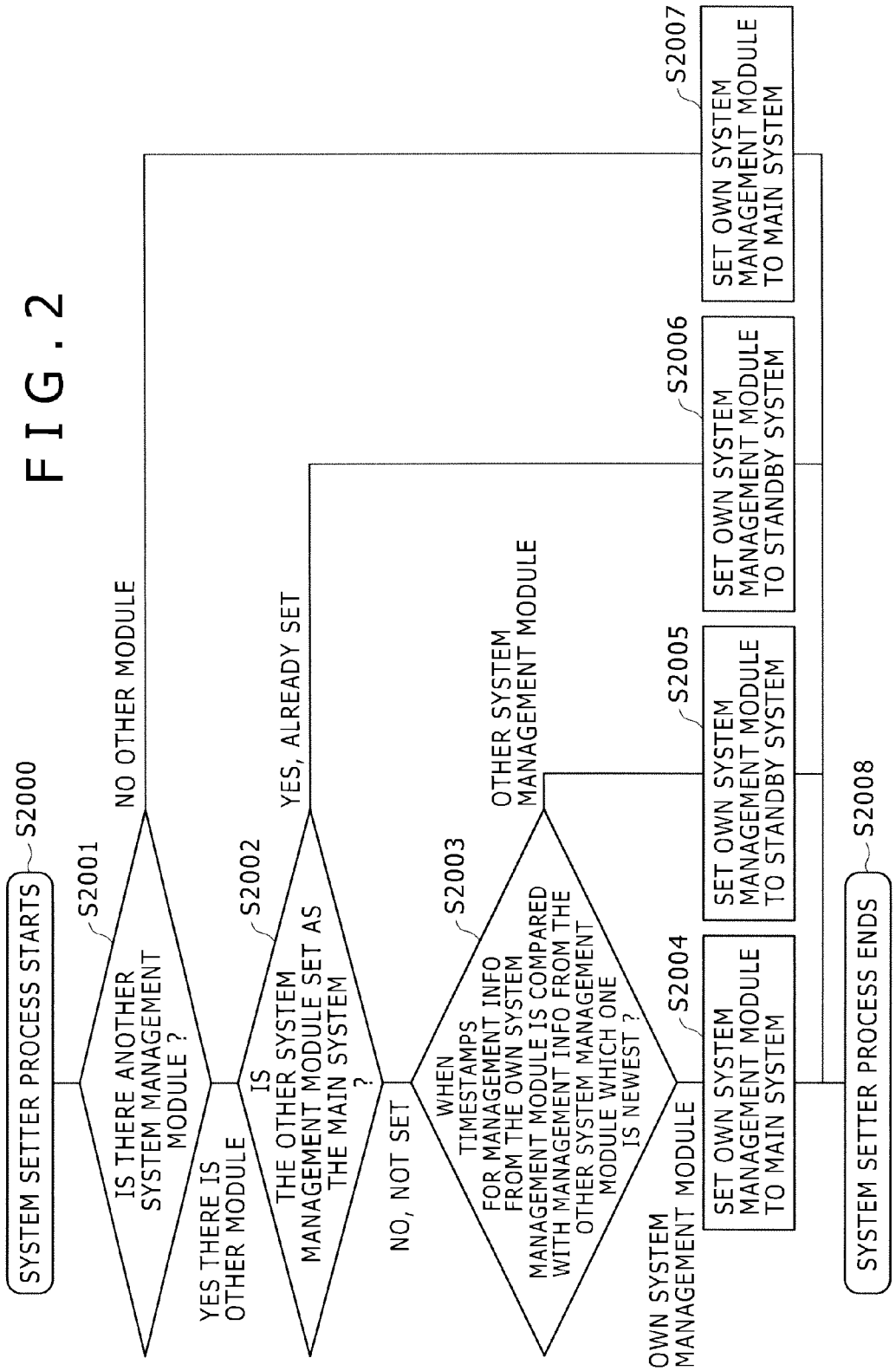
FIG. 2 is a flowchart showing the system setter process for the management module.

FIG. 2 is a flowchart showing an example of the process for setting the system of the management module. An example of the process for setting the management module 1100 system is described next.

(S2000) The management module 1100 starts the system setter process.

(S2001) The management module duplex control unit 1126 in the management module 1100 communicates with the other system management module duplex control unit 1226, and decides if other system management modules are present.

(S2007) If the results from the decision in S2001 are that there are no other system management modules then the management module 1100 is set to startup as the main system management module.

(S2002) If the results from the decision in S2001 are that there is other system management module, then the management module duplex control unit 1126 searches the management module system information 1130, and decides whether the other system management module 1200 is set as the main system.

(S2006) When the result from the decision in S2002 was to set the other system management module 1200 as the main system, then the management module 1100 is set as the standby system for startup.

(S2003) When the result from the decision in S2002 was not to set the other system management module 1200 as the main system, then the management module duplex control unit 1126 searches the SD card 1110 via the computer system management information control unit 1121. Next, the management module duplex control unit 1126 sends a request to the other system management module duplex control unit 1226, and searches the SD card 1210. The time stamps of the management information for that system's own management module 1000 and the management information for the other system management module 1200 are compared and which time stamp is newer is judged.

(S2004) When the result from the decision in S2003 is that management information in its own system management module 1100 is newer than the timestamp for management information from the other system management module 1200, then the management module 1100 is set to start up as the main system.

(S2005) If the result from the decision in S2003 is that the management information from the other system management module 1200 is newer than the timestamp on management information from in its own system management module 1100, then the management module 1100 is set to startup as the standby system.

(S2008) The management module system setter process then ends.

When the processing for deciding (hereafter, "setting") the system is finished, one unit among the two management modules 1100 and 1200 serves as the main system and the other unit serves as the standby system. Hereafter, unless otherwise refuted, in the present embodiment, the management module 1100 serves as the main system and the management module 1200 serves as the standby system. The system state is a fault (state) when a fault occurs in the management modules 1100 and 1200. When a fault state occurs in the management module serving as the main system then a management module exchange occurs, and the management module serving as the standby system functions as the main system. The system setter process is performed at management module startup and during management module exchange, and the system state of the management module is changeable.

After the system setting process, the management module duplex control unit 1126 stores the system state of the management module into the management module system information 1130. The management module duplex control unit 1126 also sends the system state of its own management module 1100 to the management module duplex control unit 1226 of the management module for the other system. The management module duplex control unit 1226 stores the system state of the management module 1100 in the management module system information 1230.

One example of the method for storing the system state is shown in the system state management table in FIG. 3. The system state of both the management modules 1100 and 1200 is stored in the system state management table 3000. The values in the system state management table 3000 are always reset to an unset system state immediately after startup of the management module.

Management information within the computer system 1000 is stored in the SD cards 1110 and 1210. The main system management module management information 1111 contains information such as log information and the user settings for the main system management modules 1100.

The server blade 1310 contains the server blade management information 1311 and the BMC 1312. The server blade management information 1311 contains information such as log information and the user settings for the server blade 1310. If the server blade became defective and components were replaced then that information must be restored. A backup is therefore stored in the SD card 1110 of the main system management module 1100 and in the SD card 1210 of the standby management module 1200 when the server blade management information 1311 is refreshed. If the server blade 1310 has broken, then the server blade management information 1311 can be restored from the SD card 1110 or the SD card 1210. The server blade 1310 need not be limited to one unit and may include plural units.

The switching module 1320 likewise includes the switching module management information 1321 and the switching module control unit 1322. The switching module management information 1321 contains information such as log information and user settings for the switching module 1320. This information must be restored even if the switching module 1320 broke down and the components were replaced, etc. A backup is therefore stored in the SD card 1110 of the main system management module 1100 and in the SD card 1210 of the standby system management module 1200 when the switching module management information 1321 is refreshed. If the switching module 1320 has broken, then the switching module management information 1321 can be restored from information in the SD card 1110 or the SD card 1210. The switching module 1320 need not be limited to one unit and may include plural units.

The management module management information 1111, the server blade management information 1311, and the switching module management information 1321 stored in the SD card 1110 within the main system management module 1100 are duplicated in the redundant structures of the main system management module 1100 and the standby system management module 1200. From here onwards in the present embodiment, the management module management information 1111, the server blade management information 1311, and the switching module management information 1321 stored in the SD card 1110 or the SD card 1210 or the external storage device 1410 is called by the general name of management information. The purpose of duplicating the management information within the SD card 1110 is to prevent loss of the backup management information when the management module 1100 breaks and is replaced.

Generally when storing management information in the redundant structure of a management module, the problem occurs that management information being managed by the management modules from within the computer system may be lost when a fault simultaneously occurs in two management modules and are replaced. Also, when both management modules are simultaneously replaced due to reasons such as hardware defects, then a backup must be made beforehand because the management information will be lost when both units are simultaneously replaced causing the problem of the large amount of time and costs in the backup task. The computer system management functions for the management module cannot continue during management module replacement so the computer system operation must be stopped to perform the replacement task so that the stoppage time must be a minimum amount of time.

In order to resolve the aforementioned problems, the present embodiment automatically stores the management information within the computer system 1000 in a location that is not the SD cards 1110 and 1210 within the management module and during simultaneous replacement of the two management module units 1100 and 1200 is capable of restoring the management information from a storage location other than the management modules 1100 and 1200.

In the present embodiment, the external storage device 1410 within the front panel module 1400 is selected as the location to automatically store the management information. The external storage device 1410 is recognized as a direct storage (unit) from the management modules 1100 or 1200. Here, a single storage (unit) is connected to only one system (in this case a management module). The front panel module 1400 therefore includes a switch 1420 to couple the external storage device 1410 and the management modules 1100, 1200. This switch 1420 functions to couple the external storage device 1410 only to either of the management modules 1100, 1200, and moreover this switch 1420 couples the external storage device 1410 to the management modules 1100, 1200 by switching to either of these management modules 1100, 1200.

In the present embodiment, the management information is usually redundant in two locations of the management modules 1100 and 1200 is made redundant in the three locations of the management modules 1100 and 1200 and the external storage device 1410. The management information storage conditions for achieving this redundancy are as follows.

(Management information storage conditions) The management information conditions are set so that the management information stored in the SD card 1110 within the main system management module, and the management information stored in the SD card 1210 within the standby system management module, and the management information stored within the external storage device 1410 are all identical information.

Figure 4B:
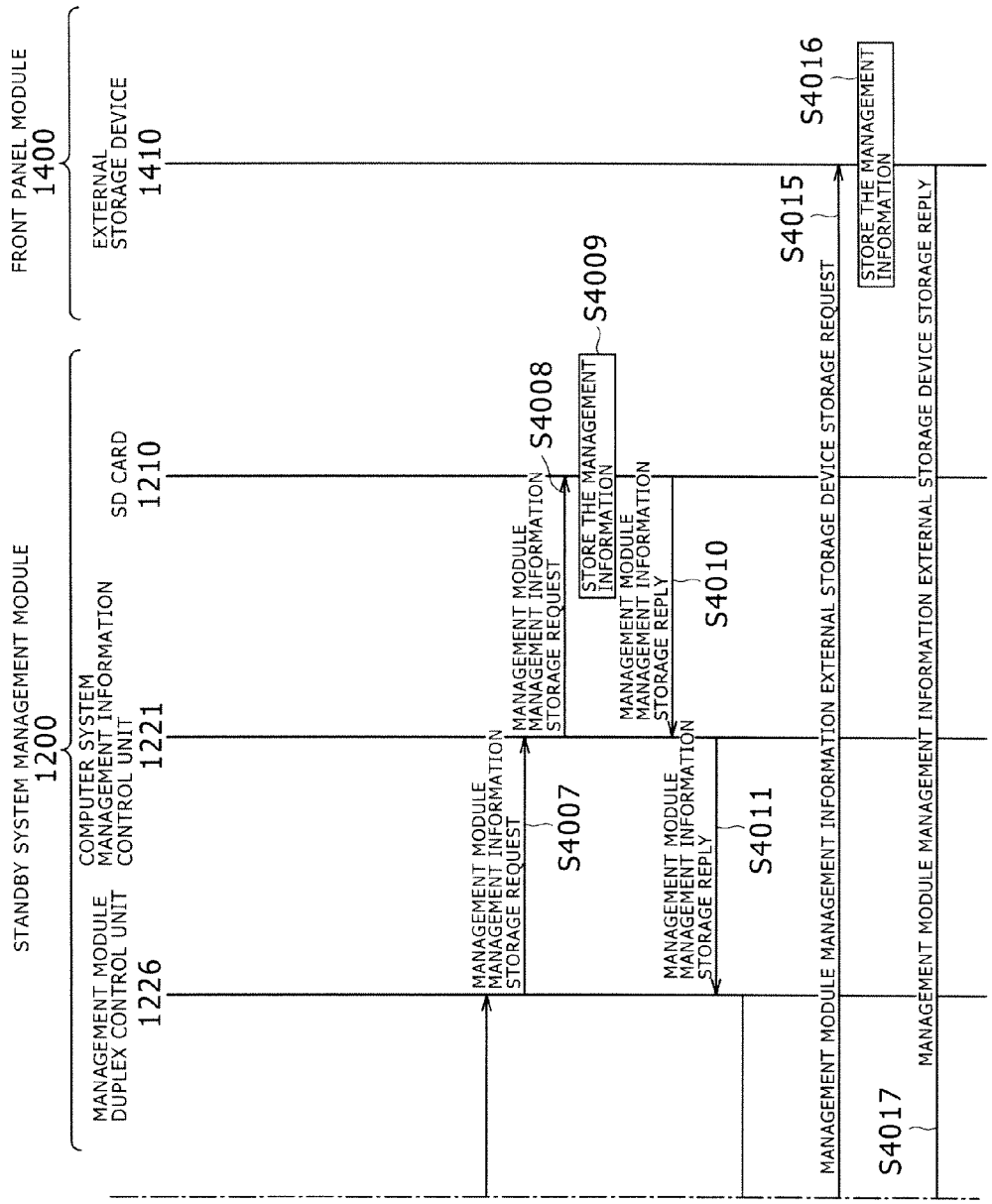

FIG. 4A and FIG. 4B are a drawing showing an example of the sequence for storing the management module management information 1111 already stored in the main system management module 1100, into the standby system management module 1200 and into the external storage device 1410.

(S4000) The computer system management information control unit 1121 within the main system management module 1100 sends a management module management information storage request to the SD card 1110.

(S4001) The SD card 1110 then stores the management module management information 1111.

(S4002) The SD card 1110 sends a management module management information storage reply to the computer system management information control unit 1121.

(S4003) The computer system management information control unit 1121 receives the management module management information storage reply and sends a standby system management module status information acquisition request to the management module duplex control unit 1126.

(S4004) The management module duplex control unit 1126 receives the standby system management module status information acquisition request, and the management module duplex control unit 1126 acquires the standby system management module status information from the management module system information 1130. The management module duplex control unit 1126 sends the standby system management module status information as a standby system management module status information acquisition reply to the computer system management information control unit 1121.

(S4005) The computer system management information control unit 1121 receives the standby system management module status information acquisition reply, confirms the presence of a standby system management module, and sends a management module management information storage request to the management module duplex control unit 1126.

(S4006) The management module duplex control unit 1126 receives the management module management information storage request per S4005, and sends a management module management information storage request to the standby system management module duplex control unit 1126.

(S4007) The management module duplex control unit 1226 receives the management module management information storage request per S4006 and sends the management module management information storage request to the computer system management information control unit 1221.

(S4008) The computer system management information control unit 1221, receives the management module management information storage request per S4007, and sends the management module management information storage request to the SD card 1210.

(S4009) The SD card 1210 then stores management module management information 1111.

(S4010) The SD card 1210 sends a management module management information storage reply to the computer system management information control unit 1221.

(S4011) The computer system management information control unit 1221 receives the management module management information storage reply per S4010, and sends the management module management information storage reply to the management module duplex control unit 1226.

(S4012) The management module duplex control unit 1226 receives the management module management information storage reply per S4011, and sends the management module management information storage reply to the management module duplex control unit 1126.

(S4013) The management module duplex control unit 1126 receives the management module management information storage reply per S4012 and sends the management module management information storage reply to the computer system management information control unit 1121.

(S4014) The computer system management information control unit 1121 receives the management module management information storage reply per S4013, and sends a management module management information external storage device storage request to the external storage device control unit 1123.

(S4015) The external storage device control unit 1123 receives the management module management information external storage device storage request and sends the management module management information external storage device storage request to the external storage device 1410.

(S4016) The external storage device 1410 has stored the management module management information 1111.

(S4017) The external storage device 1410 sends a management module management information external storage device storage reply to the external storage device control unit 1123.

(S4018) The external storage device control unit 1123 receives the management module management information external storage device storage reply, and sends the management module management information external storage device storage reply to the computer system management information control unit 1121.

The above steps store the management module management information 1111 that was stored on the SD card 1110 contained in the main system management module 1100, into the SD card 1210 within the standby system management module 1200, and in the external storage device 1410. The above described management information storage conditions are in this way satisfied. FIG. 5A and FIG. 5B are a drawing showing the sequence for the case where storing the server blade management information 1311 already stored in the server blade 1310, as management information into the management module.

(S5000) The BMC1312 sends the server blade management information refresh notice to the server blade management information control unit 1124 of the main system.

(S5001) The server blade management information control unit 1124 receives the server blade management information refresh notice and sends a server blade management information acquisition request to the BMC1312.

(S5002) The BMC1312 receives the server blade management information acquisition request and sends a server blade management information acquisition reply to the server blade management information control unit 1124.

(S5003) The server blade management information control unit 1124 receives the server blade management information acquisition reply, and sends a server blade management information storage request to the computer system management information control unit 1221.

(S5004) The computer system management information control unit 1121 receives the server blade management information storage request per S5003, and sends the server blade management information storage request to the SD card 1110.

(S5005) The server blade management information is stored in the SD card 1110. (S5006) The SD card 1110 sends the server blade management information storage reply to the computer system management information control unit 1121.

(S5007) The computer system management information control unit 1121 receives the server blade management information storage reply and sends a standby system module status information acquisition request to the management module duplex control unit 1126.

(S5008) The management module duplex control unit 1126 receives the standby system management module status information acquisition request and acquires the standby system management module status information from the management module system information 1130. The management module duplex control unit 1126 sends this acquired standby system management module status information to the computer system management information control unit 1121 as the standby system management module status information acquisition reply.

(S5009) The computer system management information control unit 1121 receives the standby system management module status information acquisition reply, checks that a standby system management module 1200 is present, and sends a server blade management information storage request to the management module duplex control unit 1126.

(S5010) The management module duplex control unit 1126 receives the server blade management information storage request and sends the server blade management information storage request to the management module duplex control unit 1226 of the standby system.

(S5011) The management module duplex control unit 1226 receives the server blade management information storage request per S5010, and sends the server blade management information storage request to the computer system management information control unit 1221.

(S5012) The computer system management information control unit 1221 receives the server blade management information storage request per S5011, and sends the server blade management information storage request to the SD card 1210.

(S5013) The server blade management information 1311 is stored in the SD card 1210. In other words, the management module duplex control unit 1126 of management module 1100 sends the management information stored in the SD card 1110 of management module 1100 to the management module duplex control unit 1226 of the management module 1200 serving as the standby system. The management module duplex control unit 1226 then stores the received management information into the SD card 1210 of the management module 1200.

(S5014) The SD card 1210 sends the server blade management information storage reply into the computer system management information control unit 1221.

(S5015) The computer system management information control unit 1221 receives the server blade management information storage reply, and sends the server blade management information storage reply to the management module duplex control unit 1226.

(S5016) The management module duplex control unit 1226 receives the server blade management information storage reply per S5015, and sends the server blade management information storage reply to the management module duplex control unit 1126.

(S5017) The management module duplex control unit 1126 receives the server blade management information storage reply per S5016 and sends the server blade management information storage reply to the computer system management information control unit 1121.

(S5018) The computer system management information control unit 1121 receives the server blade management information storage reply per S5017, and sends a server blade management information external storage device storage request to the external storage device control unit 1123.

(S5019) The external storage device control unit 1123 receives the server blade management information external storage device storage request and sends the server blade management information external storage device storage request to the external storage device 1410.

(S5020) The external storage device 1410 has already stored the server blade management information.

(S5021) The external storage device 1410 sends a server blade management information external storage device storage reply to the external storage device control unit 1123.

(S5022) The external storage device control unit 1123 receives the server blade management information external storage device storage reply and sends the server blade management information external storage device storage reply to the computer system management information control unit 1121.

In order to satisfy the management information storage conditions, when the management module management information 1111 or the server blade management information 1311 have been refreshed and that information is to be stored on management modules, the management information is first of all stored onto the SD card 1110 (S4001, S5005); and then stored onto the SD card 1210 (S4009, S5013); and finally the information is stored within the external storage device 1410 (S4016, S5020).

Moreover, when the switching module management information 1321 has been stored in the switching module 1320, that information is stored in the same type of sequence as described above in FIG. 5A and FIG. 5B, even when storing that information as management information in the management module.

The sequence in FIG. 5A and FIG. 5B for example will be a sequence showing the storing of the switching module management information 1321 onto the SD card 1110 and SD card 1210 and external storage device, when the server blade 1310 is substituted for the switching module 1320, the server blade management information 1311 is substituted for the switching module management information 1321, the BMC1312 is substituted for the switching module control unit 1322, and the server blade management information control unit 1124 is substituted for the switching module management information control units 1125.

When the management module 1100 is the main system management module, then the switching control unit 1122 controls the switch 1420 so as to couple the main system management module 1100 with the external storage device 1410. Damage to the external storage device due to simultaneous two unit access by the main system management module and standby system management module is therefore prevented, and the management information in main system management module can be stored in an external storage device.

As described above, the management module 1100 or 1200 directly recognize the external storage device 1410 as a storage (unit) so that in a state where the management module 1200 and external storage device 1410 are already connected, the connection between the external storage device 1410 and the management module 1200 is instantly cut off when the switch 1420 switches to connect the management module 1100.

The problem of unwanted logs might occur at this time due to damage to the external storage device 1410, or sudden cutoff of the external storage device 1410 from the management module 1200, etc.

The above described problems can however be resolved by fulfilling the switching conditions shown below, when refreshed management information has been stored in the external storage device 1410.

(Switching connection conditions) The external storage device 1410 is connected to the main system management module. Also, the external storage device 1410 must not connect to the standby system management module. Further, the external storage device 1410 must not connect to the management module before deciding (setting) the system to connect with.

Achieving these switch conditions is impossible just by control from the switch 1420 by way of the above described switching control units 1122, 1222. Using only this hardware is impossible because, when the switch 1420 is definitely in a state where connected to the management module of either the main system or standby system, and the startup of the management module occurs in a state where both the management module 1100 and 1200 are present, then the switch might mistakenly connect to one of the management modules whose system is still not set at that time.

In order to achieve these switching connection conditions, in the present embodiment, the external storage device control units 1123, 1223 control whether to connect that management module to the external storage device 1410 in an arrangement separate from the control by the switch 1420. The embodiment is described utilizing a computer system where the management modules 1100, 1200 including an external storage device connection unit 1140, 1240 for connecting to the switch 1420.

The external storage device control units 1123, 1223 are set to a state where the management modules 1100 and 1200 do not connect to the switch 1420, by closing the connection ports for the external storage device connection units 1140, 1240; and are set to a state where the management modules 1100 and 1200 connect to the switch 1420 by opening the connection ports.

Immediately after startup of the management modules 1100, 1200, the external storage device control units 1123, 1223 are both in a state where not connected to the management modules 1100, 1200, and the external storage device 1410. Then, when the system state has been set by the system setter process, in the management module 1100 which now serves as the main system management module, the switching control unit 1122 sets the switch 1420 to the management module 1100 side; and a state is next set where the external storage device control unit 1123 is connected to the management module 1100 and the external storage device 1410.

In the management module 1200 that now functions as the standby system management module, the switching control unit 1222 does not control the switch 1420, and the external storage device control unit 1223 remains unconnected to the external storage device 1410. If a fault occurs in the main system management module 1100, and the management module 1200 that served as the standby system management module now becomes the main system, then the external storage device control unit 1123 is set to a state where the management module 1100 does not connect to the external storage device 1410, the switching control unit 1222 sets the switch 1420 to the management module 1200 side, and then the external storage device control unit 1223 sets to a state where the management module 1200 is connected to the external storage device 1410.

In a specific example, the external storage device 1410 is a USB memory, the management module 1100 includes a USB port connected to the external storage device control unit 1123; and when the management module 1200 includes a USB port connected to the external storage device control unit 1223, then external storage device control unit 1123, 1223 closes the USB port when in a state not connected to the USB memory, and opens the USB port when in a state connected to the USB memory.

Namely, the connection port closes when the system state of the management modules 1100, 1200 is not yet set or when the system state changes. The management modules 1100, 1200 system state is set; and the main system management module opens after the switch sets to the main system management module. The connection port for the main system management module stays closed at this time. The connection between the external storage device 1410 and the management modules 1100, 1200 is therefore suddenly cut off to prevent unwanted logs such as due to sudden to cutoff of the external storage device 1410.

In the present embodiment, the conditions for management information storage set the management information within the main system management module, the management information within the standby system management module, and the management information within the external storage device to the same values. In regard to the management information stored in the external storage device 1410, the main system management module 1100 executes processing to synchronize the management information in the SD card 1110 and the management information in the external storage device 1410 immediately after setting the management module 1100 to startup as the main system. In regard to management information stored in the standby system management module 1200, the standby system management module 1200 acquires management information in the SD card 1110 immediately after the predetermined management module 1200 starts up as the standby system, and the same management information as held the SD card 1110 is stored into the SD card 1210.

A component must be replaced in cases where the management module has broken due to a fault and so on. If the management module 1200 serving as the standby system management module is replaced in a state where the management modules 1100 and 1200 are both present, then the replaced standby system management module 1200 will start up as the standby system and is synchronized with the management information held in the main system management module 1100 so that there is no loss of management information. Also, if replacing the module 1100 serving as the main system management module, then the management module system is replaced at the point in time that a fault or failure has occurred in the main system management module 1100, and the management module 1200 functions as the main system so that management module 1100 functions as the standby system at the point in time the management module 1100 was replaced. So there is no loss of management information the same as when replacing the management module 1200.

However, when replacing the management module 1100 in a state where only the management module 1100 is present, then the management information within the computer system 1000 is the only management information in the external storage device 1410 at the point in time that the management module 1100 was removed. In this state, when the replaced management module 1100 was determined to start up as the main system, then the management information in the external storage device 1410 will be overwritten by the management information on the SD card 1110 when processing was executed to synchronize the SD card 1110 management information to the external storage device 1410, so that the loss of management information that was retained prior to replacement will be caused. Essentially, the management information on the SD card 1110 must be restored by using the management information in the external storage device 1410.

Therefore, at the point in time a management module was set to operate as the main system, and the module itself was just replaced, then the SD card 1110 management information is restored by using the management information in the external state then the management information on the SD card 1110 must be synchronized to the management information in the external storage device 1410. The decision process to decide whether to perform a management information synchronizing process or perform a restore process is hereafter called the restore decision process.

Figure 6:
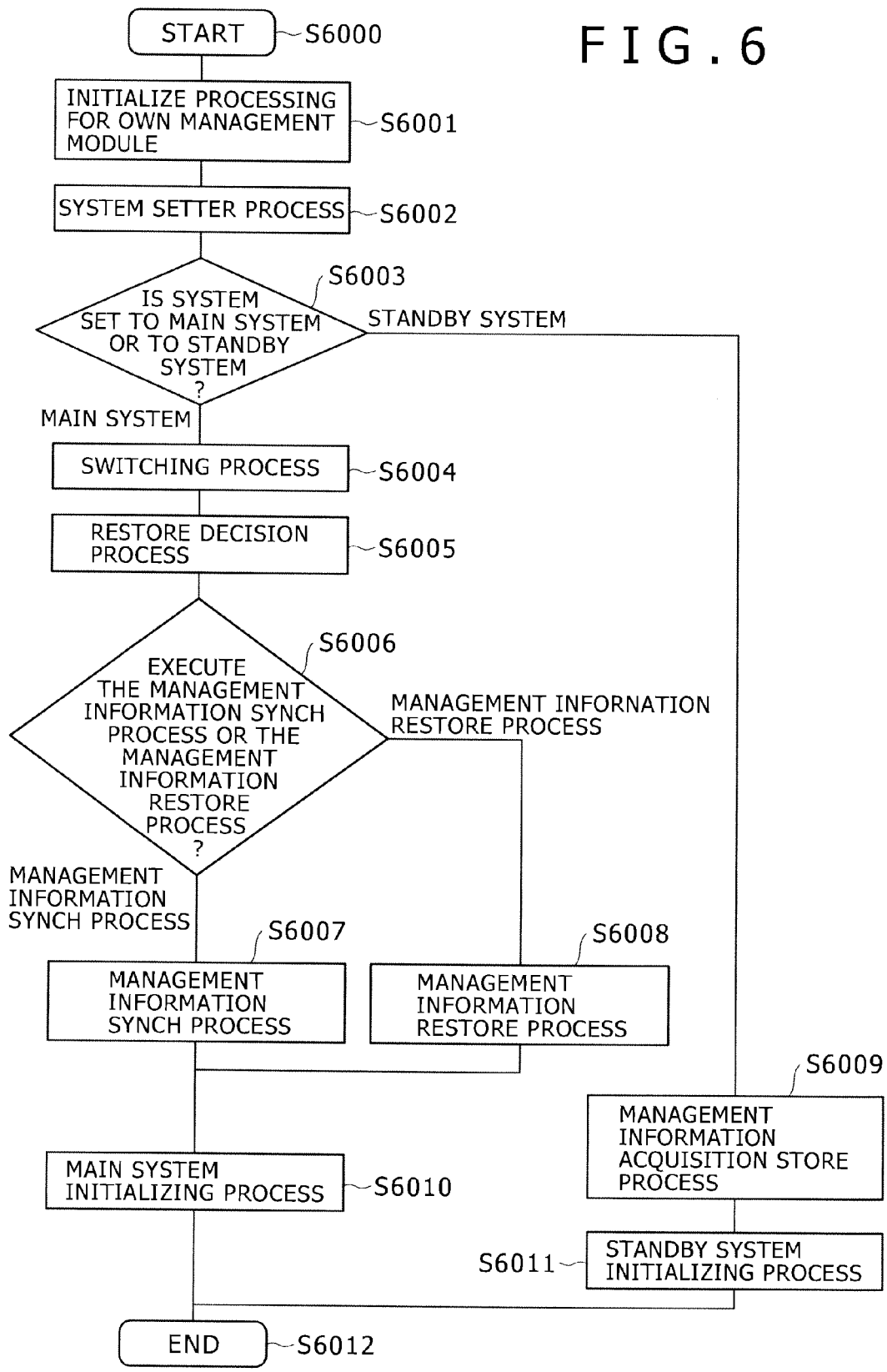
FIG. 6 is a flowchart showing the process during management module startup.

FIG. 6 is a flowchart showing the process during management module startup.

(S6000) The management module 1100 begins the startup process.

(S6001) The initializing process for the management module itself is executed immediately after startup of the management module 1100. An initial diagnosis of the hardware contained in the management module is executed during the initialing process for the management module itself, and a check is made for any faults that might have occurred in the management module itself. Processing is also performed to connect to the duplex control units of other system management modules.

(S6002) The system setter process shown in FIG. 2 is next performed.

(S6003) The system state decision process is performed in the system setter process of S6002.

(S6004) If the result from the decision in S6003 is the main system, then the switching control unit 1122 performs the switchover process. In this switchover process, the switching control unit 1122 sets the switch 1420 to the main system management module 1100 side. The external storage device control unit 1123 sets the connection port to an open state to connect the computer control unit 1120 and the switch 1420.

(S6005) The restore decision process is performed next. The restore decision process decides whether to perform synchronizing processing or to perform restore processing. The restore decision processing is described next in detail later on.

(S6006) The process decision is made as follows from the restore decision process results in S6005.

(S6007) If the result from the decision in S6006 is to perform the management information synchronizing process, then the management information is synchronized with the management information in the external storage device 1410 during the management information synchronizing process.

(S6008) If the result from the decision in S6006 is to perform the management information restore process, then the management information restore process is executed. The details on the processing information contents for the management information restore process are described in detail later on.

(S6010) The main system initializing process is executed next. This main system initializing process executes fault (or failure) monitoring of each module within the computer system 1000 and enables the management console of the management module. When the main system initializing process is complete, the computer system management functions of each management module start to operate.

(S6009) If results from the decision in S6003 are that the system has become the standby system, then the management information acquisition storage process is executed. In this management information acquisition storage process, management information acquisition request is issued to the main system management module at the point in time that the management module 1100 is decided as the standby system, and by storing the acquired information, the management module 1100 stores the management information identical to that contained in the main system management module into the SD card 1110, and then starts up.

(S6011) The standby system initializing process is next executed. The computer system management functions do not operate in the standby system management module so functions such as start of fault management that were executed in the main system are not implemented in the standby system initializing process. However, the management console in the management module is enabled. When the standby system initializing process is complete, the preparation for replacing the management module is now finished so that when a fault occurs in the main system management module from here onwards, the management module is replaced and the computer system can continue operation without stoppage of the computer system management functions.

(S6012) The management module startup process is now complete.

Figure 7B:
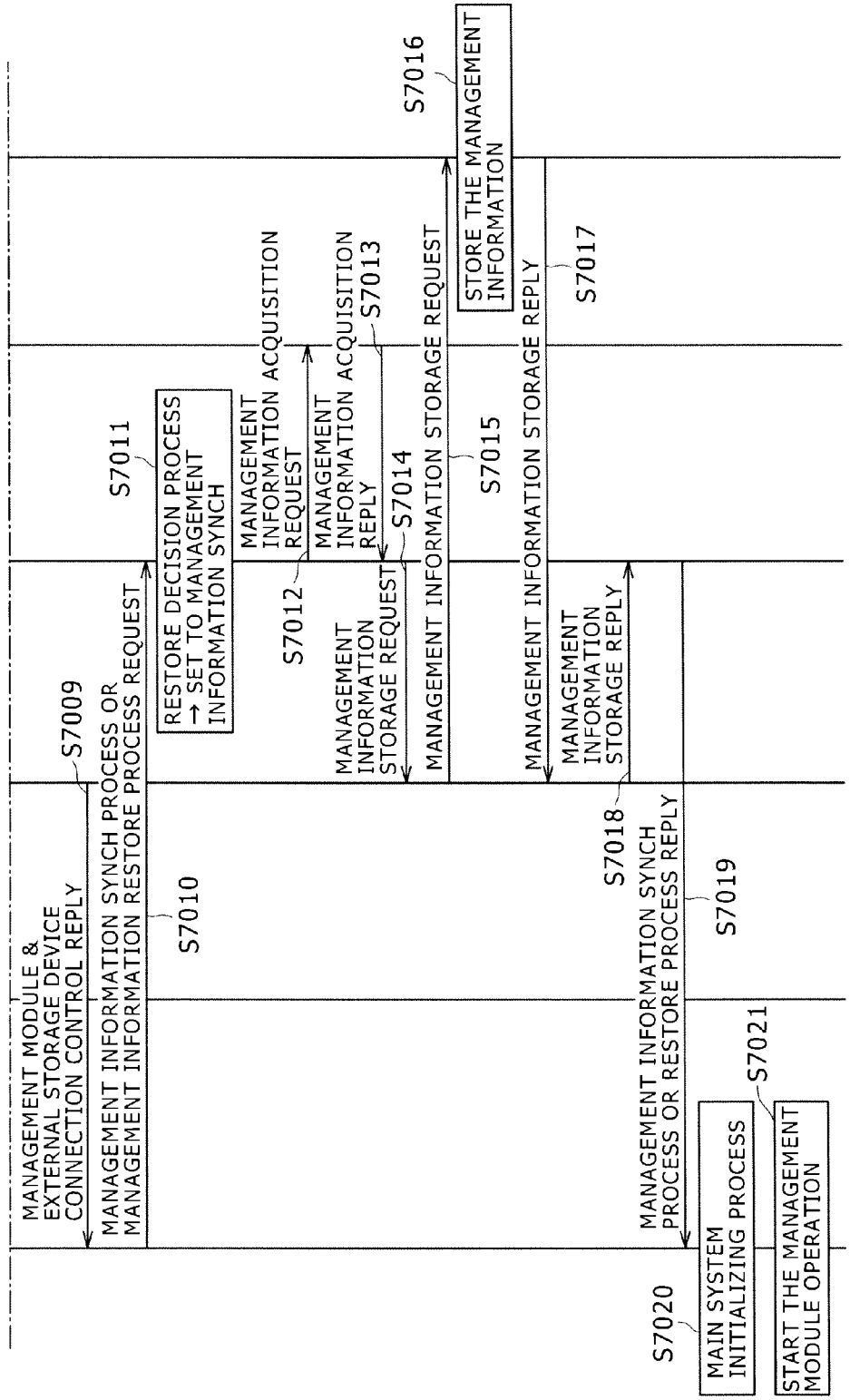

FIG. 7A and FIG. 7B are a sequence diagram for describing the processing from startup of the main system management module 1100 to the beginning of operation.

(S7000) The management module 1100 starts.

(S7001) The management module 1100 has not been set to either system at this point in time so that the external storage device 1410 and management module 1100 are not connected. In other words, the external storage device control unit 1123 closes the connection port so as not to connect the computer control unit 1120 and the switch 1420.

(S7002) The initializing process for the management module itself is executed.

(S7003) The system setter process shown in FIG. 2 is performed next. This process sets the management module 1100 to start up as the main system.

(S7004) The main system management module duplex control unit 1126 sends a switchover request to the switching control unit 1122.

(S7005) The switching control unit 1122 receives a switchover request and sets the switch 1420 to the main system management module 1100 side.

(S7006) The switching control unit 1122 sends a switchover reply to the main system management module duplex control unit 1126.

(S7007) The management module duplex control unit 1126 receives the switchover reply and sends a connection control request for connecting the management module and external storage device, to the external storage device control unit 1123.

(S7008) The external storage device control unit 1123 receives the connection control request for connecting the management module and external storage device, and opens the connection port to connect the management module 1100 and the external storage device 1410.

(S7009) The external storage device control unit 1123 sends the connection control reply for connecting the external storage device to the management module in the management module duplex control unit 1126.

(S7010) The management module duplex control unit 1126 receives the connection control reply for connecting the external storage device to the management module and sends the management information synchronizing process or the management information restore process request to the computer system management information control unit 1121.

(S7011) The computer system management information control unit 1121 receives the management information synchronizing process or the management information restore process request and executes the restore decision process. The restore decision process is S6005 in FIG. 6 and the processing contents are described later on for the management information restore method.

(S7012) The result in the decision of S7011 is to set the management information synchronization and the computer system management information control unit 1121 sends a management information acquisition request to the SD card 1110.

(S7013) The SD card 1110 receives the management information acquisition request, and sends the management information stored in the SD card 1110 to the computer system management information control unit 1121 as a management information acquisition reply.

(S7014) The computer system management information control unit 1121 receives the management information acquisition reply and sends the acquired management information to the external storage device control unit 1123 as a management information storage request.

(S7015) The external storage device control unit 1123 receives the management information storage request per S7014 and sends the management information storage request to the external storage device 1410.

(S7016) The management information is stored in the external storage device 1410, Namely, the external storage device control unit 1123 stores the management information stored on the SD card 1110 (management information storage unit) of management module 1100, into the external storage device 1410.

(S7017) The external storage device 1410 sends the management information storage reply to the external storage device control unit 1123.

(S7018) The external storage device control unit 1123 receives the management information storage reply per S7017, and sends the management information storage reply to the computer system management information control unit 1121.

(S7019) The computer system management information control unit 1121 receives the management information storage reply per S7018, and sends the management information synchronizing process or the management information restore process request to the management module duplex control unit 1126.

(S7020) The main system initializing process is executed in this step.

(S7021) The management module operation starts in this step.

In the present embodiment, the management module duplex control unit 1126 fulfills the tasks of sequencing and executing: the switchover request S7004 for switching over the switch 1420; connection control request S7007 for the management module 1100 and external storage device 1410 in order to connect to the external storage device 1410; and the management information synchronizing process or the management information restore process request S7010 for executing the management information synchronizing processing.

Figure 8:
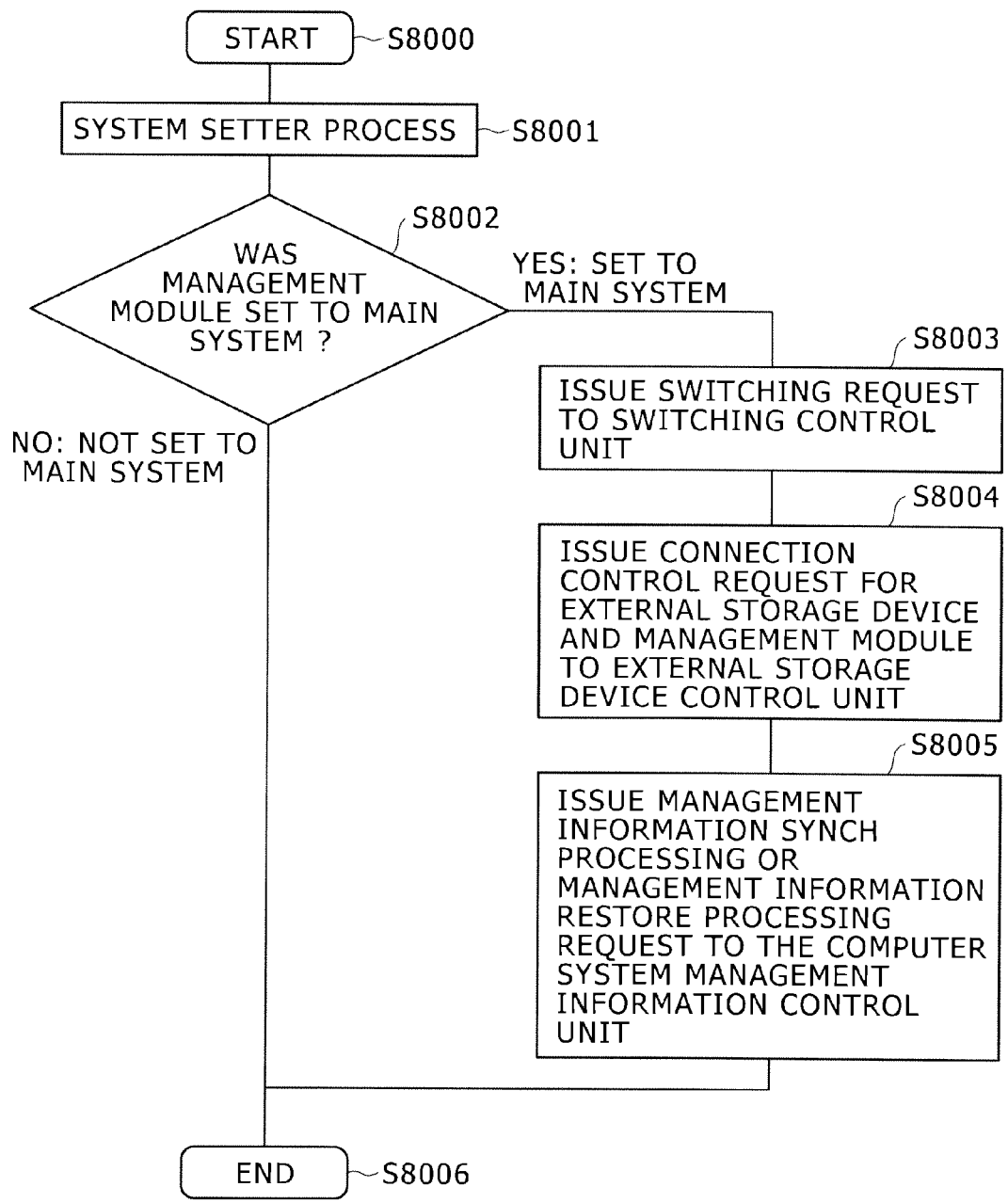
FIG. 8 is a flowchart for describing the processing by the management module duplex control unit during startup of the management module.

FIG. 8 is a flowchart for describing an example of the processing by the management module duplex control unit 1126 during startup of the management module 1100.

(S8000) The management module duplex control unit 1126 starts the processing.

(S8001) The system setter process shown in FIG. 2 is then performed.

(S8002) System state results from the system setter process in S8001 are then decided.

(S8003) When results from the decision of S8002 are that the management module 1100 system has become the main system, then a switchover request is sent to the switching control units 1122. However, when results from the decision of S8002 are that the system is not the main system then no action is taken.

(S8004) A connection control request to connect the management module 1100 and external storage device 1410 is next sent to the external storage device control unit 1123.

(S8005) The management information synchronizing process or the management information restore process request is issued to the computer system management information control unit 1121.

(S8006) The processing by the management module duplex control unit 1126 then ends at the startup of the management module 1100.

Figure 9:
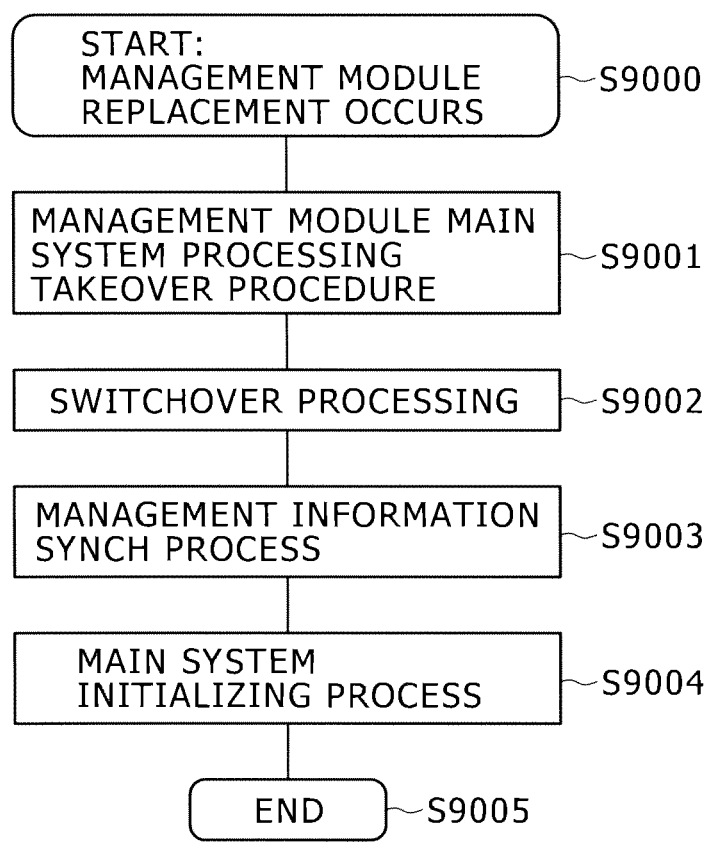
FIG. 9 is a flowchart of the startup of the standby system management module as the new main system management module when a fault occurred in the main system management module.

The process during management module replacement is described next. FIG. 9 is a flowchart for describing the processing for management module 1200, when the management module 1100 functioning as the main system has a fault; and the management module 1200 as the standby system now starts up as the main system management module (new main system management module).

(S9000) Replacement of the management module is performed. Replacement occurs for example when the management module 1100 serving as the main system has failed.

(S9001) The process for takeover of the main system processing for the management module is first of all executed. The main system processing takeover process for the management module functions so that the processing that was (formerly) executed by the management module 1100 serving as the main system, is now performed by the new main system management module 1200. One example of such processing is the failure monitoring and the opening of external interface port.

(S9002) Next, in the switchover process for the switch 1420, the switching control unit 1222 for the new main system management module 1200 sets the switch 1420 to the management module 1200 side.

(S9003) In the management information synchronizing process, the management information synchronizing is implemented in the external storage device 1410.

(S9004) The main system initializing process is implemented.

(S9005) The management module replacement ends, and the management module 1200 operates as the management module for the main system.

Figure 10B:
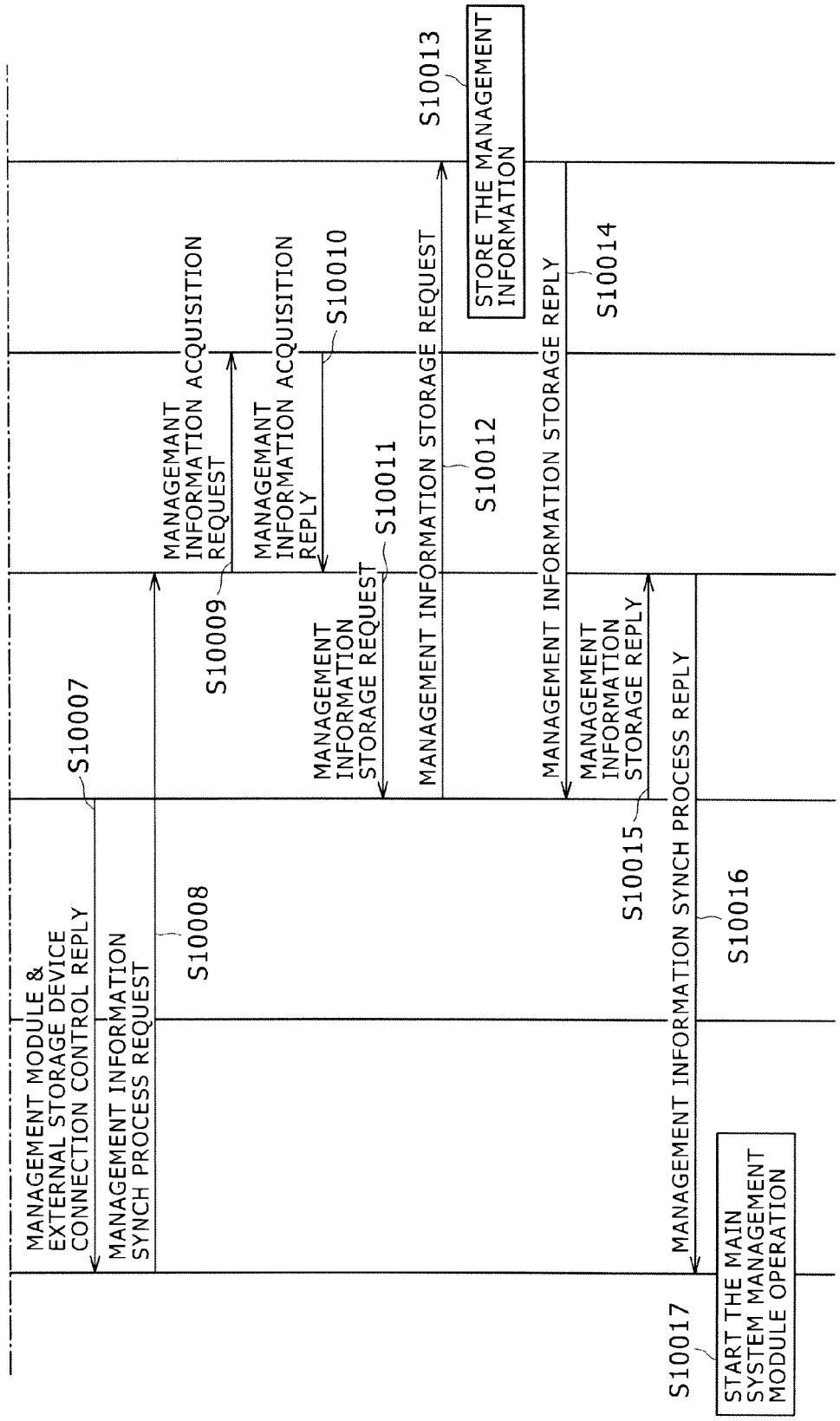

FIG. 10A and FIG. 10B are a sequence drawing for describing the processing in the management module 1200, when a failure occurred in the management module 1100, and the management module 1200 is operating as the new main system management module. Some points overlap (repeat) the points in FIG. 7A and FIG. 7B so mainly the points differing from FIG. 7A and FIG. 7B are described here.

(S10000) An opportunity for management module system replacement is detected.

(S10001) The new main system management module duplex control unit 1226 takes over the main system processing.

(S10008) The management module duplex control unit 1226 sends a management information synchronizing process request to the computer system management information control unit 1221.

(S10016) The computer system management information control unit 1221 sends the management information synchronizing process reply to the management module duplex control unit 1226.

(S10017) The management module 1200 starts operating as the new main system management module 1200.

In the present embodiment, the management module duplex control unit 1226 fulfills the tasks of sequencing and executing: the switchover request (S10002) for switching over the switch 1420; a connection control request (S10005) for the external storage device 1410 and main system management module 1200 in order to connect to the external storage device 1410; and a management information synchronizing process request (S10008) for the processing to synchronize the management information.

Figure 11:
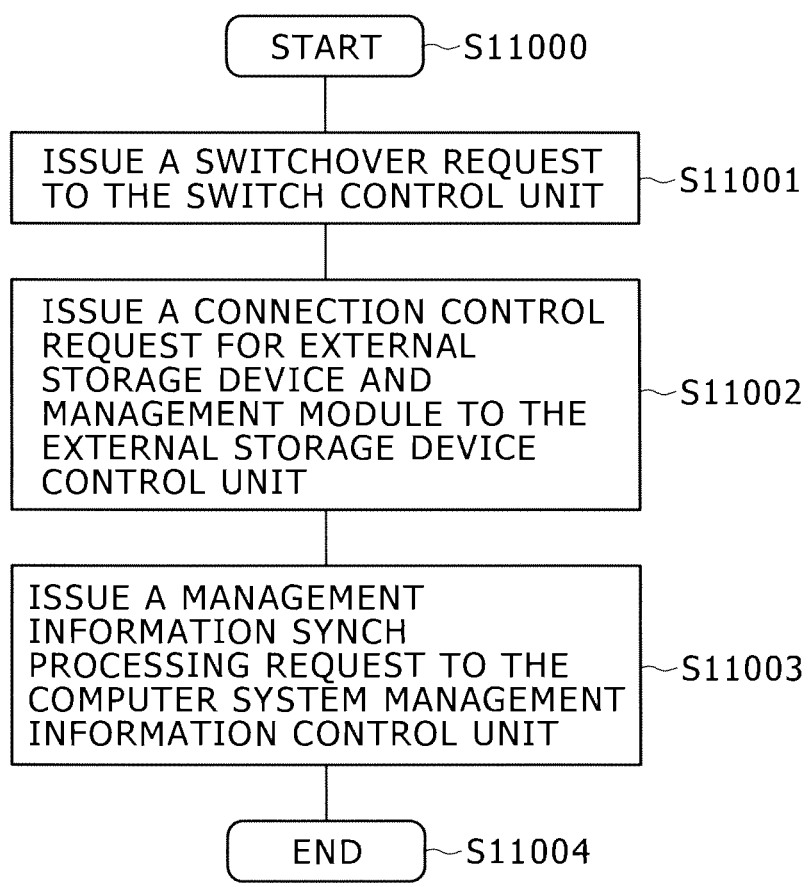
FIG. 11 is a flowchart of the management module duplex control unit during exchange of the management modules.

FIG. 11 is a flowchart of the management module duplex control unit 1226.

(S11000) The management module duplex control unit 1226 starts the processing.

(S11001) A switchover request is sent to the switching control unit 1222.

(S11002) A connection control request for connecting the management module 1200 and external storage device 1410 is next sent to the external storage device control unit 1223.

(S11003) The management information synchronizing process request is sent to the computer system management information control unit 1221.

(S11004) The processing ends

In the computer system 1000 of the present embodiment, the above described processing achieves synchronization among the management information stored in the SD card 1110 within the main system management module, management information stored in the SD card 1210 within the standby system management module, and the management information stored within the external storage device 1410.

Next, the restore method for restoring management information within the management module after performing component replacement in cases such where a part is replaced due to failure of the management module and so on is described next in detail.

As already described, patterns for component replace of the management module basically include two cases: the case where replacing the standby system management module; and the case where replacing the main system management module. The processing for these two patterns is described in sequence and in detail next. The case where replacing the standby system management module is first of all described, and then the case where replacing the main system management module.

In the case where replacing the standby system module, the standby system management module acquires the management information from the main system management module SD card before starting up, the same as during management module startup, and stores the same management information as within the main system management module SD card, into the standby system management module SD card, and then starts.

Figure 12B:
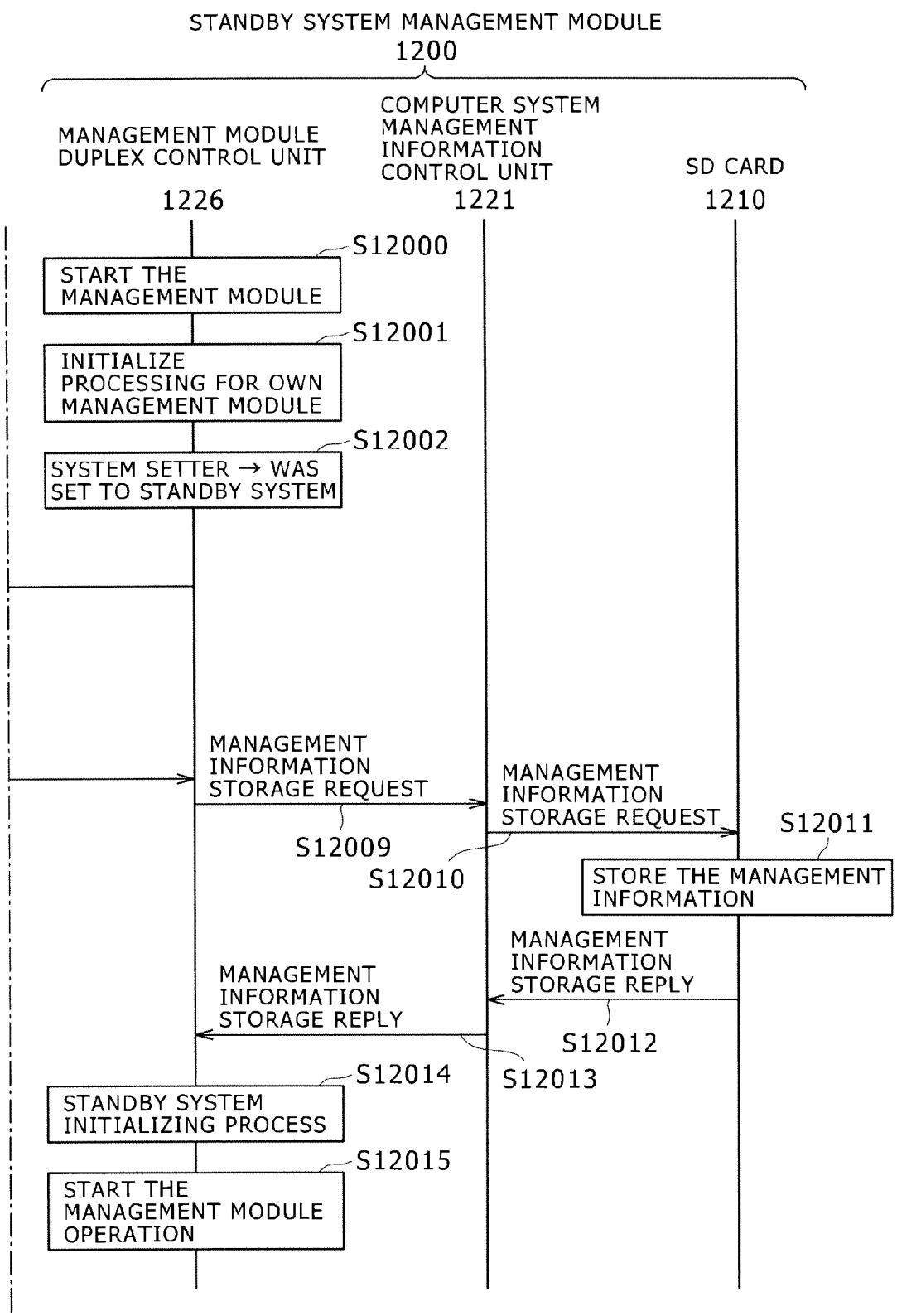

FIG. 12A and FIG. 12B are a drawing of the sequence from startup to the beginning of operation when a replacement component was inserted as the standby system management module.

(S12000) The management module 1200 starts up.

(S12001) The initializing process for the management module 1200 itself is executed.

(S12002) The system setter process shown in FIG. 2 is next implemented, and the management module 1200 is set to startup as the standby system.

(S12003) The management module duplex control unit 1226 for the standby system sends a management information storage request to the management module duplex control unit 1126 for the main system.

(S12004) The management module duplex control unit 1126 receives the management information storage request per S12003, and sends the management information storage request to the computer system management information control unit 1121.

(S12005) The computer system management information control unit 1121 receives the management information storage request and sends a management information acquisition request to the SD card 1110.

(S12006) The SD card 1110 receives the management information acquisition request, and sends a management information storage reply to the computer system management information control unit 1121.

(S12007) The computer system management information control unit 1121 receives a management information acquisition reply per S12006, and sends a management information storage request to the management module duplex control unit 1126.

(S12008) The management module duplex control unit 1126 receives the management information storage request per S12007 and sends the management information storage request to the management module duplex control unit 1226.

(S12009) The management module duplex control unit 1226 receives the management information storage request per S12008 and sends the management information storage request to the computer system management information control unit 1221.

(S12010) The computer system management information control unit 1221 receives the management information storage request per S12009, and sends the management information storage request to the SD card 1210.

(S12011) The SD card 1210 stores the management information.

(S12012) The SD card 1210 sends a management information storage reply to the computer system management information control unit 1221.

(S12013) The computer system management information control unit 1221 receives the management information storage reply per S12012, and sends the management information storage reply to the management module duplex control unit 1226.

(S12014) The standby system initializing process is implemented.

(S12015) The management module 1200 starts operation.

Next, is the case where replacing the main system management module. In this case, the restore decision process is implemented just as already described, and if the main system management module is in a state where just replaced then the management information in the management module is restored using the management information in the external storage device; and if not in that state then the management information in the management module is synchronized with the management information in the external storage device. However, if replacement of the management module is complete, then after once restoring the management module management information with the management information in the external storage device, the management information in the management module is synchronized with the external storage device at the next startup.

FIG. 13 is a flowchart of the restore decision process.

(S13000) The restore decision process starts.

(S13001) In the restore decision process, in order to decide whether or not the management module 1100 has just been replaced, in the present embodiment a decision is made on whether the management information is stored in the SD card 1110, and the SD card 1110 has two states; a state where there is management information, and a state where there is no management information. The replacement component is therefore shipped in a state with no management information stored on the SD card 1110, and if restored even just once, then management information is stored within the SD card 1110, and the SD card 1110 is in a state containing management information. The fact that management information is stored on the SD card 1110 allows deciding that there is a management information file present.

(S13003) When the result from S13001 is that there is management information in the main system management module SD card 1110, then a decision is made to implement the management information synchronizing process.

(S13002) When the result from S13001 is that there is no management information in the main system management module SD card 1110, then a decision is made on whether there is management information in the external storage device 1410.

(S13004) When the result from the decision in S13002 is that there is management information in the external storage device 1410, then a decision is made to implement the management information restore process.

(S13005) When the result from the decision in S13002 is that there is no management information in the external storage device 1410 then for example, assembly of the computer system is performed by way of a computer system assembly process. In this case, restoring the information from the external storage device 1410 has no significant effect so the management information in the management module 1100 is set to the default (initial) values, and after storing those values on the SD card 1110, a process to synchronize that information with the external storage device 1410 is implemented.

(S13006) The processing ends.

If both of the management module units must be replaced, then just one new management module is inserted after removing both the management modules 1100 and 1200 from the computer system 1000. There is only one management module unit present in the computer system 1000 at this time so that module is set to startup as the main system, and from results in the decision in FIG. 13, the restore process is implemented from the management information within the external storage device 1410. After verifying that restore process for restoring the management information in management module that has become the next main system is now complete the other management module 1200 is then inserted. The management module 1200 is inserted in a state where the management module 1100 is operating so that module 1200 is set to start operating as the standby system. Prior to startup of the standby system management module 1220, the processing in FIG. 12A and FIG. 12B issues an acquisition request to the main system management module 1100 for management information contained in the main system management module, and by storing the acquired information, starts the storing of management information identical to that in the main system management module 1100, into the SD card 1210.

Figure 14B:
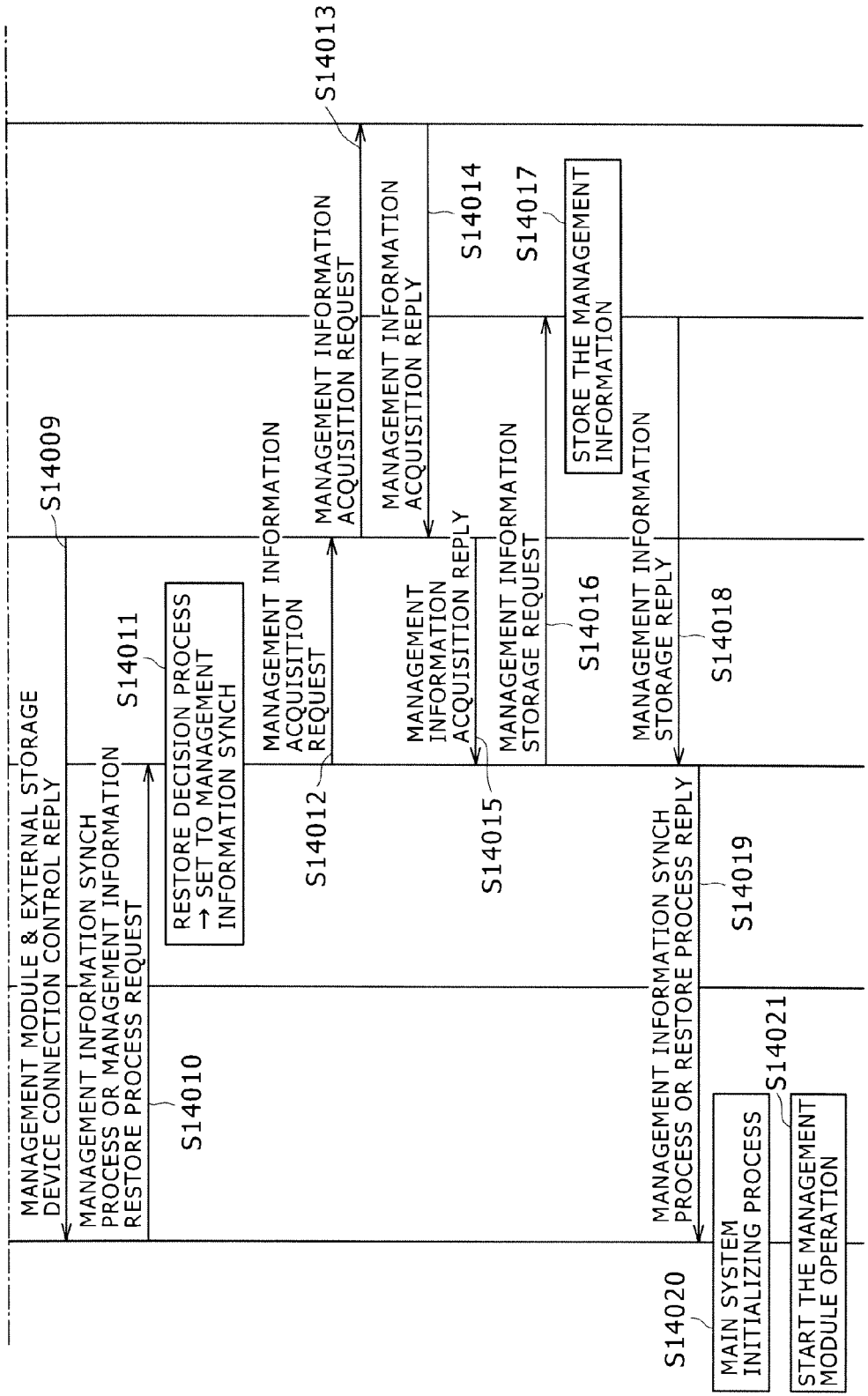

FIG. 14A and FIG. 14B are a drawing that shows the sequence for executing the management information restore process in case where inserting a replacement component as the main system management module. There are points overlapping those in FIG. 7A and FIG. 7B so only those points differing from FIG. 7A and FIG. 7B are given here.

(S14011) The restore decision process decides to execute restoring of the management information.

(S14012) The computer system management information control unit 1121 for the main system sends a management information acquisition request to the external storage device control unit 1123.

(S14013) The external storage device control unit 1123 sends the management information acquisition request to an external storage device.

(S14014) The external storage device 1410 receives the management information acquisition request per S14013, and sends a management information acquisition reply to the external storage device control unit 1123.

(S14015) The external storage device control unit 1123 receives the management information acquisition reply per S14014, and sends the management information acquisition reply to the computer system management information control unit 1121.

(S14016) The computer system management information control unit 1121 receives the management information acquisition reply per S14015, and sends the management information acquisition request to the SD card 1110.

(S14017) The SD card 1110 contains management information, and the SD card is in a state where there is management information, so that when the management module 1100 next starts up, the restore decision process selects the synchronizing process.

(S14018) The SD card 1110 sends a management information storage reply to the computer system management information control unit 1121.

The computer system 1000 of the present embodiment implements the above described processing to execute the restore process for restoring the management information within the external storage device 1410.

Second Embodiment

In the first embodiment, the external storage device 1410 and the switch 1420 were stored in the front panel module 1400 however the external storage device 1410 and the switch 1420 need not always be in the front panel module.

Figure 15B:
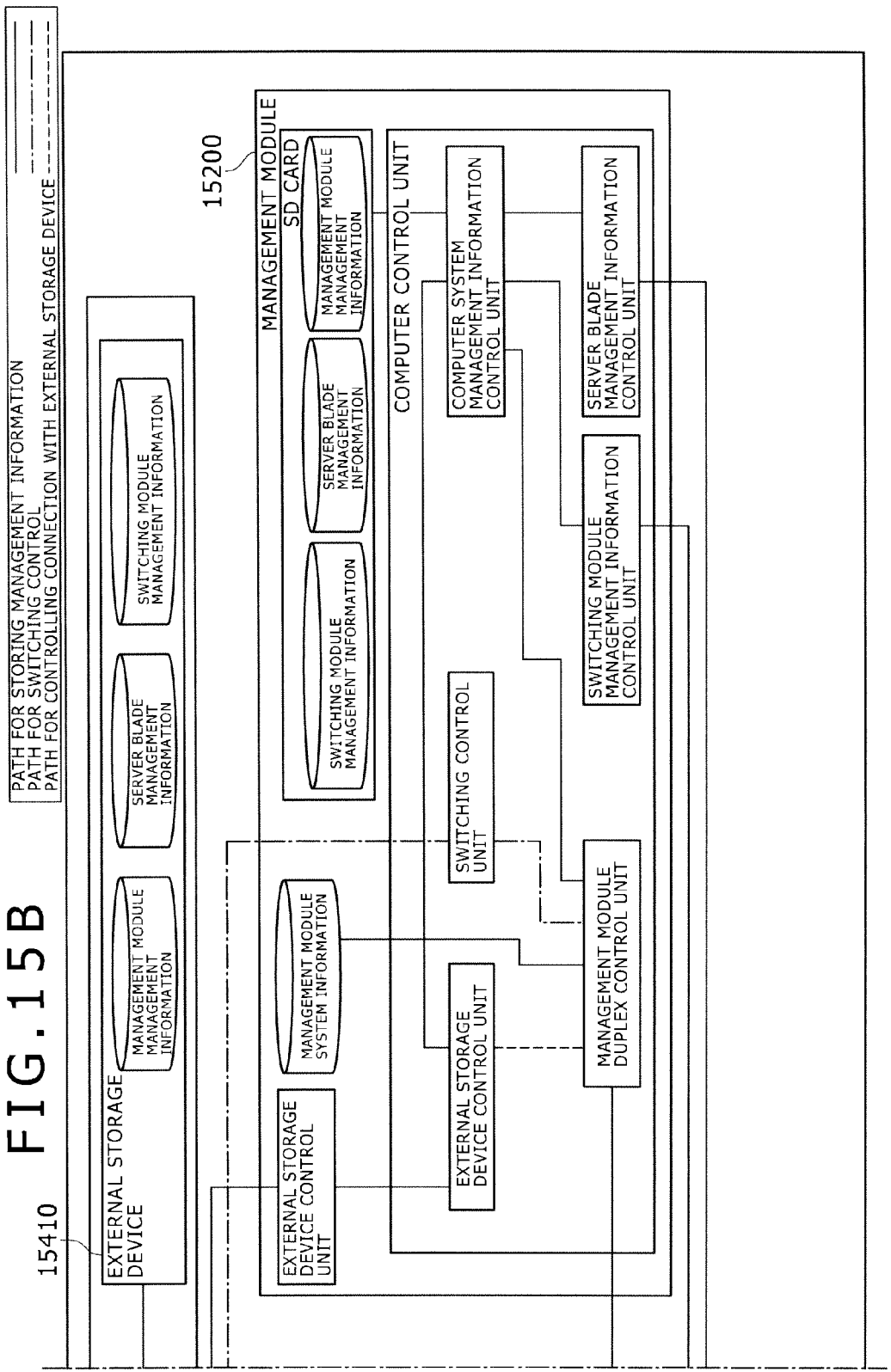

In the second embodiment for example, the management information backup module 15400 as shown in FIG. 15A and FIG. 15B is mounted within the computer system 15000, and a dedicated module may also be provided for storing the external storage device 15410 and the switch 15420.

The management information backup module 15400 is connected to the management modules 15100 and 15200. The sequences and the flowcharts for synchronizing and restoring the management information are identical to the computer system of the first embodiment and so are omitted here.

The computer system and computer system information storage method shown above in the first and second embodiments is capable of restoring the management information to the computer system by utilizing the management information stored in the external storage device, when a failure occurred in the main system and standby system management modules and the two management module units need to be simultaneously replaced. Moreover, the management module replacement requires no management information backup operation so the server down time can be shortened.

Another possible information storage method different from the first embodiment and second embodiment, is that a server can be installed outside the computer system as an external storage device in computer systems that include a server and management module, and can function as a method to store the management information by way of a network.

In this method, equipment other than the computer system is required when first installing the computer system, extra costs are required, and an installation site separate from the computer system is needed. This method also has the problem that costs are required for maintenance of the server itself. Moreover, network communication over a server and software for storing the information is required in order to store the management information over a network linking the computer system with the server of an outside computer system. This software also requires functions for control to prevent loss of the management information and so has the problem that software development costs are required.

In the computer system according to the first embodiment and second embodiment, the external storage device is installed as storage within the computer system and so is inexpensive and does not apply a burden to the purchaser in the form of extra equipment. Moreover, a computer system can be achieved that stores the management information for the main system management module in the external storage device without requiring dedicated software for the external storage device, and also prevents the loss of management information occurring during damage in the external storage device due to simultaneous access of the external storage device by the two main system and standby system management module units.

The present invention is not limited to the above described embodiments and may incorporate a variety of adaptations and modifications. The above embodiments were detailed descriptions for the purpose of making the present invention easy to understand, however the present invention is not necessarily restricted to all of the described structures. Further, a portion of the structure of the embodiment may also be substituted for structures in the other embodiments and also the structure of the other embodiment may be added to the structure of the applicable embodiment. Portions of the structures in each embodiment may also be added, omitted, or substituted with other structures.

The above described compositions, functions, processing units and processing methods and so on, may also be achieved in whole or in part by hardware such as by integrated circuit design. The above described compositions, functions and so on may also be achieved by software that interprets and executes programs to implement the respective functions by processors. Information on the tables, files, and programs and so on to achieve each function may be stored on recording devices such as a memory, hard disk, or SSD (Solid State Drive); or a recording medium such as an IC card, SD card, or DVD.

The above information included a description of the control wires and information wires considered necessary. However, the product might not always include all of the indicated control wires and information wires. In actual use nearly all of the structures may be considered as mutually connected.

What is claimed is:

1. A computer system comprising a physical server, a plurality of management modules, wherein at least one of the management modules is a main system module configured to manage the physical server, and
   a switch configured to connect the management module to an external storage device,
   wherein each of the management module comprises:
   a switching control unit configured to control the switching connection of the switch;
   a storage unit configured to store the management information of the computer system; and
   a multiplexer control unit configured to control the multiplexing of the management information in the management modules; and
   an external storage device control unit configured to control the external storage device,
   wherein, in a case where the computer system comprises a first management module whose state is the main system and a second management module whose state is standby,
   the switching control unit for the first management module is configured to control the switch to connect the first management module to the external storage device,
   after a management information in the storage unit of the first management module is updated in response to an update of a management information stored in the server module, the external storage device control unit and the multiplexer control unit for the first management module control are configured to store the updated management information stored in the storage unit for the first management module, into the external storage device and the storage unit for the second management module,
   when at least one of the first management module and the second management module fails and a third management module is added as an alternative management module of the failed management module,
   the multiplexer control unit of the third management module is configured to:
      determine whether a status of the third management module is main or standby;
      in a case the status of the third management module is main, store the management information stored in the external storage device to the storage unit for the third management module,
      in a case the status of the third management module is standby, acquire the management information stored in the storage unit for the first management module whose state is main via the external storage device and store the acquired management information to the storage unit for the third management module.

2. The computer system according to claim 1,
   wherein the multiplexer control unit for the first management module is configured to send a management information storage request including management information stored in a storage unit for the first management module, to the multiplexer control unit for the second management module whose system state is the standby system.

3. The computer system according to claim 2, wherein
   the management module includes management module system information for managing the plural management module system states in the computer system, and
   when the multiplexer control unit for the second management module searches the management module system information, and detects that the system state of the first management module is a fault or failure,
   the multiplexer control unit is configured to send a switchover request to the switching control unit for the second management module to switch the connection destination of the external storage device from the first management module to the second management module, and
   the switching control unit for the second management module is configured to control the switch, based on the switchover request received from the multiplexer control unit for the second management module, and connect the second management module to the external storage device.

4. The computer system according to claim 3, wherein
   when the first management module is replaced with a new management module, and the system state of the replacement first management module is the main system,
   the replacement first management module is configured to:
   decide whether or not there is management information was stored in the storage unit in the replacement first management module, and
   when decided that there is no management information stored in the storage unit in the replacement first management module,
   acquire the management information stored in the external storage device from the external storage device, and
   store the management information acquired from the external storage device, into the storage unit in the replacement first management module, and
   when the above decision is that there is management information stored in the storage unit in the replacement first management module,
   the external storage device control unit for the first management module is configured to store the management information stored in the storage unit in the replacement first management module into the external storage device,
   the multiplexer control unit for the first management module is configured to receive the management information storage request sent from the multiplexer control unit for the second management module whose system state is the standby system, and send the management information stored in the storage unit in the replacement first management module, into the multiplexer control unit for the second management module, and
   the multiplexer control unit for the second management module is configured to store the management information stored in the storage unit for the replacement first management module that was received from the multiplexer control unit for the first management module, into the storage unit in the second management module.

5. The computer system according to claim 4, wherein
   the management module includes a connection port to control the connection status between the switch and the management module, and the external storage device control unit is configured to:
close the connection port during startup of the management module, to set a state where the management module and the switch are not connected,
open the connection port when the system state of the management module that started is the main system, to set a state where the management module and the switch are connected, and
keep the connection port in a closed state when the management module that started is not the main system.

6. The computer system according to claim 5,
wherein the management information for the computer system includes at least one from among: management information for the main system management module, management information for the physical server, and management information for the switching module managed in the main system management module.

7. A management information storage method for a computer system a physical server, a plurality of management modules, wherein at least one of the management modules is a main system module configured to manage the physical server, and
a switch configured to connect the management module to an external storage device,
wherein each of the management module comprises:
a switching control unit configured to control the switching connection of the switch;
a storage unit configured to store the management information of the computer system; and
a multiplexer control unit configured to control the multiplexing of the management information in the management modules; and
an external storage device control unit configured to control the external storage device,
wherein, in a case where the computer system comprises a first management module whose state is the main system and a second management module whose state is standby,
the switching control unit for the first management module is configured to control the switch to connect the first management module to the external storage device,
after a management information in the storage unit of the first management module is updated in response to an update of a management information stored in the server module, the external storage device control unit and the multiplexer control unit for the first management module control are configured to store the updated management information stored in the storage unit for the first management module, into the external storage device and the storage unit for the second management module,
when at least one of the first management module and the second management module fails and a third management module is added as an alternative management module of the failed management module,
the multiplexer control unit of the third management module is configured to:
determine whether a status of the third management module is main or standby;
in a case the status of the third management module is main, store the management information stored in the external storage device to the storage unit for the third management module,
in a case the status of the third management module is standby, acquire the management information stored in the storage unit for the first management module whose state is main via the external storage device and store the acquired management information to the storage unit for the third management module.

8. The management information storage method according to claim 7,
wherein the multiplexer control unit for the first management module sends a management information storage request including the management information stored in the storage unit in the first management module, to the multiplexer control unit for the second management module whose system state is the standby state.

9. The management information storage method according to claim 8,
wherein the management module includes management module system information to manage the plural management module system states contained in the computer system; and
the multiplexer control unit for the second management module searches the management module system information and when a fault or failure is detected in the system state of the first management module,
sends a switchover request to the switching control unit for the second management module, to switch the connection destination of the external storage device from the first management module to the second management module, and
the switching control unit for the second management module controls the switch, based on the switchover request received from the multiplexer control unit for the second management module, and connects the second management module to the external storage device.

10. The management information storage method according to claim 9,
wherein when the first management module has been replaced with a new management module and the system state of that replacement first management module is the main system then:
the replacement first management module:
decides whether or not there is management information stored in the storage unit for the replacement first management module, and
when the decision is that there is no management information stored in the storage unit for the replacement first management module:
acquires the management information stored in the external storage device from the external storage device, and
stores the management information acquired from the external storage device, into the storage unit in the replacement first management module, and
when the above decision is that there is management information stored in the storage unit for the replacement first management module,
the external storage device control unit for the first management module stores the management information stored in the storage unit for the replacement first management module, into the external storage device,
the multiplexer control unit for the first management module sends management information stored in the storage unit for the replacement first management module, to the multiplexer control unit for the second management module whose system state is the standby system, and
the multiplexer control unit for the second management module stores the management information stored in the storage unit for the replacement first management module that was received from the multiplexer control unit for the first management module, into the storage unit in the second management module.

11. The management information storage method according to claim 10,
wherein the management module includes a connection port to control the connection status between the switch and the management module, and
the external storage device control unit:
closes the connection port during startup of the management module, to set a state where the management module and the switch are not connected,
opens the connection port when the system state of the management module that started is the main system, to set a state where the management module and the switch are connected, and
keeps the connection port in a closed state when the management module that started is not the main system.

12. The management information storage method according to claim 11, wherein the management information for the computer system includes at least one from among management information for the main system management module, management information for the physical server, and management information for the switching module managed in the main system management module.

* * * * *